(12) United States Patent
Song et al.

(10) Patent No.: US 11,133,706 B2
(45) Date of Patent: Sep. 28, 2021

(54) WIRELESS POWER TRANSMITTER

(71) Applicant: Samsung Electronics Co., Ltd., Suwon-si (KR)

(72) Inventors: Keum-Su Song, Seoul (KR); Do-Won Kim, Suwon-si (KR); Jae-Hyun Park, Yongin-si (KR); Sung-Ku Yeo, Suwon-si (KR); Young-Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 689 days.

(21) Appl. No.: 15/744,487

(22) PCT Filed: Jul. 21, 2016

(86) PCT No.: PCT/KR2016/007976
§ 371 (c)(1),
(2) Date: Apr. 17, 2018

(87) PCT Pub. No.: WO2017/018723
PCT Pub. Date: Feb. 2, 2017

(65) Prior Publication Data
US 2019/0067994 A1     Feb. 28, 2019

(30) Foreign Application Priority Data
Jul. 28, 2015   (KR) .................. 10-2015-0106330

(51) Int. Cl.
*H01F 27/42*  (2006.01)
*H01F 37/00*  (2006.01)
(Continued)

(52) U.S. Cl.
CPC ............ *H02J 50/005* (2020.01); *H02J 7/025* (2013.01); *H02J 50/10* (2016.02); *H02J 50/12* (2016.02); *H02J 50/40* (2016.02); *H02J 50/70* (2016.02)

(58) Field of Classification Search
CPC .. H02J 50/12; H02J 50/10; H02J 50/70; H02J 7/025; H02J 50/40; H02J 50/005; H02J 7/0004
See application file for complete search history.

(56) References Cited

U.S. PATENT DOCUMENTS 7,622,891 B2 *  11/2009  Cheng .................... H02J 5/005
                                                   320/108
2005/0068009 A1   3/2005  Aoki
(Continued)

FOREIGN PATENT DOCUMENTS

JP   2005-110399 A   4/2005
JP   2007-082152 A   3/2007
(Continued)

*Primary Examiner* — Daniel Cavallari
*Assistant Examiner* — Rasem Mourad
(74) *Attorney, Agent, or Firm* — Jefferson IP Law, LLP

(57) ABSTRACT

A wireless power transmitter is disclosed. The wireless power transmitter may include a first coil for generating a first magnetic field of a first direction in order to charge a first wireless power receiver which is disposed in a first posture on the wireless power transmitter, and a second coil for generating a second magnetic field of a second direction in order to charge a second wireless power receiver which is disposed in a second posture on the wireless power transmitter.

6 Claims, 19 Drawing Sheets

(51) Int. Cl.
*H01F 38/00* (2006.01)
*H02J 50/00* (2016.01)
*H02J 50/40* (2016.01)
*H02J 50/70* (2016.01)
*H02J 50/10* (2016.01)
*H02J 50/12* (2016.01)
*H02J 7/02* (2016.01)

(56) References Cited

U.S. PATENT DOCUMENTS

| | | |
|---|---|---|
| 2011/0136550 A1 | 6/2011 | Maugars |
| 2012/0133214 A1 | 5/2012 | Yun et al. |
| 2012/0169278 A1* | 7/2012 | Choi ............... H02J 7/025 320/108 |
| 2012/0223595 A1* | 9/2012 | Oodachi ........... H02J 50/10 307/104 |
| 2013/0093252 A1* | 4/2013 | Norconk ........... B60L 50/40 307/104 |
| 2014/0159501 A1* | 6/2014 | Kanno ............. H02J 50/60 307/104 |
| 2016/0118841 A1* | 4/2016 | Makwinski ........ H04B 5/0037 320/108 |
| 2016/0126751 A1* | 5/2016 | Tsuda ............. H02J 50/90 307/104 |

FOREIGN PATENT DOCUMENTS

| | | |
|---|---|---|
| KR | 10-0691060 B1 | 3/2007 |
| KR | 10-2012-0057153 A | 6/2012 |
| KR | 10-2012-0078995 A | 7/2012 |
| KR | 10-2013-0101245 A | 9/2013 |
| KR | 10-2015-0046567 A | 4/2015 |

* cited by examiner

WIRELESS POWER TRANSMITTER

CROSS-REFERENCE TO RELATED APPLICATION(S)

This application is a U.S. National Stage application under 35 U.S.C. § 371 of an International application filed on Jul. 21, 2016 and assigned application number PCT/KR2016/007976, which claimed the benefit of a Korean patent application filed on Jul. 28, 2015 in the Korean Intellectual Property Office and assigned Serial number 10-2015-0106330, the entire disclosure of which is hereby incorporated by reference.

TECHNICAL FIELD

The present disclosure generally relates to a wireless power transmitter, and more particularly, to a wireless power transmitter that is capable of wirelessly charging a wireless power receiver.

BACKGROUND ART

Mobile terminals, such as cellular phones or Personal Digital Assistants (PDAs), are characterized as being driven by rechargeable batteries. In order to charge such a battery, a separate charging device is used to supply electric energy to the battery of the mobile terminals. Generally, the charging device and the battery are respectively provided with separate external contact terminals, which are brought into contact with each other to electrically connect the charging device and the battery.

However, in such a contact-type charging method, the contact terminals protrude to the outside and thus can be easily contaminated by foreign matter, in which case battery charging is not properly performed. Also, when the contact terminals are exposed to moisture, charging is not properly performed.

To solve these problems, wireless charging or non-contact charging technology has recently been developed and used for various electronic devices.

Wireless charging technology uses wireless power transmission and reception, for example, a system in which a battery can be automatically charged simply by placing a cellular phone on a charging pad without connecting the cellular phone to a separate charging connector. This system is generally known to ordinary people due to incorporation in a wireless electric toothbrush or a wireless electric shaver. Such wireless charging technology can enhance a waterproof function by wirelessly charging electronic products and can increase the portability of electronic devices since no wired charger is needed. Further, related technology is expected to significantly develop in the upcoming electric car era.

Wireless charging technology broadly includes an electromagnetic induction method using a coil, a resonant method using resonance, and a Radio Frequency (RF)/microwave radiation method of converting electrical energy to transmit microwaves.

A power transmission method employing electromagnetic induction is a method of transmitting power between a primary coil and a secondary coil. When a magnet is moved around a coil, an induced current is generated. A transmitting end generates a magnetic field using the induced current, and a current is induced by a change in the magnetic field at a receiving end to generate energy. This phenomenon is called magnetic induction, and a power transmission method using this phenomenon has excellent energy transmission efficiency.

As a resonant method, in 2005 MIT professor Soljacic released the Coupled-Mode Theory, relating to a system of wirelessly delivering electricity despite separation at a distance of even several meters (m) from a charging device using a resonant power transmission principle. The MIT team's wireless charging system employs the physics concept of resonance in which a vibrating tuning fork induces a neighboring wine glass to oscillate at the same frequency. The research team resonated electromagnetic waves having electrical energy, instead of resonating a sound. The resonated electrical energy is transmitted directly only in the presence of a device with a corresponding resonance frequency, and unused energy is reabsorbed into the electromagnetic field, instead of spreading to the air. Thus, it is considered that such electromagnetic waves have no effect on surrounding machines or the human body, unlike other electromagnetic waves.

DETAILED DESCRIPTION OF THE INVENTION

Technical Problem

A wireless power transmitter may include a coil for wireless power transmission. With various types of wireless power receivers to perform wireless charging, wireless power receivers are also disposed in various orientations in a wireless power transmitter. For example, an electronic device, such as a smartphone, may be disposed such that a coil included therein is parallel to a coil of a wireless power transmitter, while a wristwatch-type electronic device may be disposed such that a coil included therein is disposed perpendicular to the coil of the wireless power transmitter. Wireless charging efficiency may significantly change depending on the direction of a magnetic field incident to a receiving coil, and thus the wireless charging efficiency of an electronic device may be considerably reduced depending on the orientation in which the electronic device is disposed.

Various embodiments of the present disclosure may provide a wireless power transmitter for solving the foregoing problem or other problems.

Technical Solution

In accordance with various embodiments of the present disclosure, a wireless power transmitter may include: a first coil that generates a first magnetic field in a first direction in order to charge a first wireless power receiver that is disposed in a first orientation on the wireless power transmitter; and a second coil that generates a second magnetic field in a second direction in order to charge a second wireless power receiver that is disposed in a second orientation on the wireless power transmitter.

In accordance with various embodiments of the present disclosure, a wireless power transmitter may include: a first housing in a bowl shape that accommodates a first wireless power receiver disposed in a first orientation on the wireless power transmitter; and a second housing in a pillar shape that is included in an internal side of the first housing and on which a second wireless power receiver disposed in a second orientation on the wireless power transmitter is mounted, wherein the first housing may include a first coil that generates a first magnetic field in a first direction in order to charge the first wireless power receiver and the second housing may include a second coil that generates a radial second magnetic field in order to charge the second wireless power receiver.

In accordance with various embodiments of the present disclosure, a wireless power transmitter may include: a first housing in a bowl shape that accommodates a first wireless power receiver disposed in a first orientation on the wireless power transmitter; and a second housing in a pillar shape that is included in an internal side of the first housing and on which a second wireless power receiver disposed in a second orientation on the wireless power transmitter is mounted, wherein the second housing may include two sub-coils disposed parallel to each other, a radial magnetic field may be formed between the sub-coils to charge the second wireless power receiver, and a magnetic field perpendicular to the sub-coils may be formed over or under the sub-coils to charge the first wireless power receiver.

Advantageous Effects

According to various embodiments of the present disclosure, a wireless power receiver disposed on a wireless power transmitter may perform high-efficiency wireless charging regardless of the disposition orientation. Accordingly, there may be provided a wireless power transmitter capable of charging various types of wireless power receivers.

MODE FOR CARRYING OUT THE INVENTION

Figure 1:
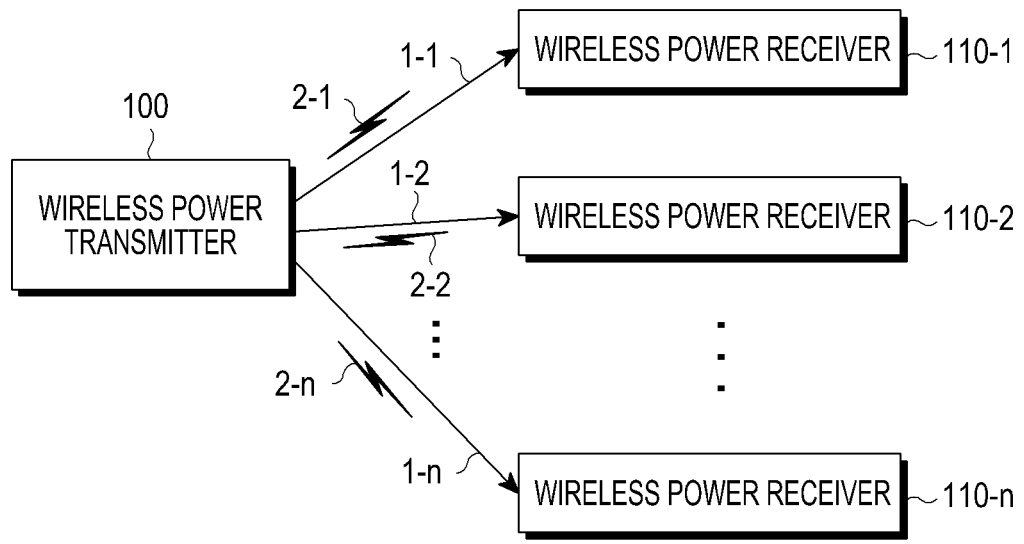
FIG. 1 is a conceptual view illustrating the overall operation of a wireless charging system.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/ or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expressions "a first," "a second," "the first," "the second," and the like, used in various embodiments, may modify various elements irrespective of order and/or importance thereof and do not limit the corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

A wireless power receiver according to various embodiments of the present disclosure may be included in various electronic devices For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

First, the concept of a wireless charging system that can be applied to an embodiment of the present disclosure is described with reference to FIG. 1.

FIG. 1 is a conceptual view illustrating the overall operation of a wireless charging system. As illustrated in FIG. 1, the wireless charging system includes a wireless power transmitter 100 and at least one wireless power receiver 110-1, 110-2, and 110-*n*.

The wireless power transmitter 100 may wirelessly transmit power 1-1, 1-2, and 1-*n* to the at least one wireless power receiver 110-1, 110-2, and 110-*n*. In detail, the wireless power transmitter 100 may wirelessly transmit power 1-1, 1-2, and 1-*n* to a wireless power receiver that has been authenticated via a predetermined authentication procedure.

The wireless power transmitter 100 may be electrically connected with the wireless power receiver 110-1, 110-2, and 110-*n*. For example, the wireless power transmitter 100 may transmit wireless power in the form of electromagnetic waves to the wireless power receiver 110-1, 110-2, and 110-*n*. Here, the wireless power transmitter 100 may transmit wireless power based on an inductive method or a resonant method.

Meanwhile, the wireless power transmitter 100 may perform two-way communication with the wireless power receiver 110-1, 110-2, and 110-*n*. Here, the wireless power transmitter 100 and the wireless power receiver 110-1, 110-2, and 110-*n* may process, transmit or receive a communication signal 2-1, 2-2, and 2-*n* including a predetermined frame. The wireless power receiver may be provided particularly as a mobile communication terminal, a PDA, a PMP, a smartphone, or the like.

The wireless power transmitter 100 may wirelessly provide power to a plurality of wireless power receivers 110-1, 110-2, and 110-*n*. For example, the wireless power transmitter 100 may provide power to the plurality of wireless power receivers 110-1, 110-2, and 110-*n* through a resonant method. When the wireless power transmitter 100 adopts the resonant method, the distance between the wireless power transmitter 100 and the plurality of wireless power receivers 110-1, 110-2, and 110-*n* may be a distance enabling operation in an indoor environment. When the wireless power transmitter 100 adopts an electromagnetic induction method, the distance between the wireless power transmitter 100 and the plurality of wireless power receivers 110-1, 110-2, and 110-*n* may be preferably 10 cm or less.

The wireless power receivers 110-1, 110-2, and 110-*n* may receive wireless power from the wireless power transmitter 100 to charge respective batteries provided therein. Further, the wireless power receivers 110-1, 110-2, and 110-*n* may transmit signals for requesting wireless power transmission, information necessary for wireless power reception, state information on wireless power receivers, and control information for the wireless power transmitter 100 to the wireless power transmitter 100.

The wireless power receivers 110-1, 110-2, and 110-*n* may also transmit a communication signal representing each charging state to the wireless power transmitter 100.

The wireless power transmitter 100 may include a display tool, such as a display, and may display the state of the individual wireless power receivers 110-1, 110-2, and 110-*n* based on a message received from the individual wireless power receivers 110-1, 110-2, and 110-*n*. In addition, the wireless power transmitter 100 may also display the estimated time required in order to completely charge the individual wireless power receivers 110-1, 110-2, and 110-*n*.

The wireless power transmitter 100 may also transmit a control signal to disable a wireless charging function to the wireless power receivers 110-1, 110-2, and 110-*n*. Upon receiving the control signal to disable the wireless charging function from the wireless power transmitter 100, the wireless power receiver may disable the wireless charging function.

Figure 2:
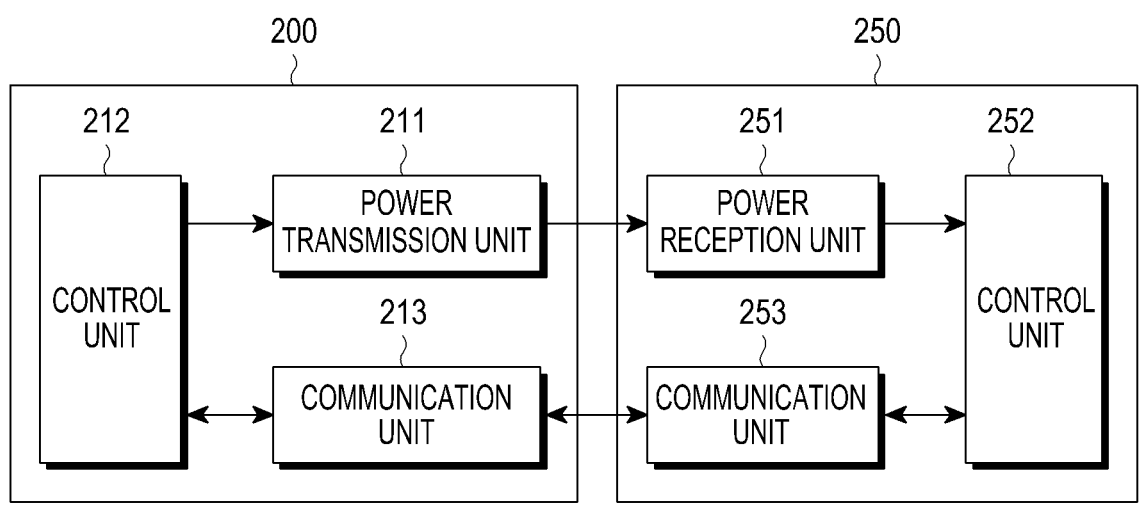
FIG. 2 is a block diagram illustrating a wireless power transmitter and a wireless power receiver according to an embodiment of the present disclosure.

FIG. 2 is a block diagram illustrating a wireless power transmitter and a wireless power receiver according to an embodiment of the present disclosure.

As illustrated in FIG. 2, the wireless power transmitter 200 may include a power transmission unit 211, a control unit 212 and a communication unit 213. The wireless power receiver 250 may include a power reception unit 251, a control unit 252, and a communication unit 253.

The power transmission unit 211 may provide power required by the wireless power transmitter 200 and may wirelessly provide power to the wireless power receiver 250. Here, the power transmission unit 211 may transmit power in the form of an AC waveform, or may transmit power in the form of an AC waveform by converting power supplied in the form of a DC waveform into an AC waveform using an inverter. Those skilled in the art would readily understand that the power transmission unit 211 is not limited as long as it can provide power having an AC waveform.

In addition, the power transmission unit 211 may provide an AC waveform to the wireless power receiver 250. The power transmission unit 211 may further include a resonance circuit or an induction circuit, and accordingly may transmit or receive predetermined electromagnetic waves. When the power transmission unit 211 is provided as a resonance circuit, the inductance L of a loop coil of the resonance circuit may be changed. Those skilled in the art would readily understand that the power transmission unit 211 is not limited as long as it can transmit and receive electromagnetic waves.

The control unit 212 may control the overall operation of the wireless power transmitter 200. The control unit 212 or the control unit 252 may control the overall operation of the wireless power transmitter 200 using an algorithm, a program, or an application required for control that is read from a storage unit (not shown). The control unit 212 may be provided as a CPU, a microprocessor, or a minicomputer. The control unit 252 may control the overall operation of the wireless power receiver 250.

The communication unit 213 may communicate with the wireless power receiver 250 in a predetermined manner. The communication unit 213 may communicate with the communication unit 253 of the wireless power receiver 250 using Near-Field Communication (NFC), ZigBee communication, infrared communication, visible light communication, Bluetooth communication, and Bluetooth Low Energy (BLE) communication modes. The communication unit 213 may use a CSMA/CA algorithm. Meanwhile, the above-mentioned communication modes are merely examples, and the scope of claims of embodiments of the present disclosure is not limited to a specific communication mode performed by the communication unit 213.

The communication unit 213 may transmit a signal about information on the wireless power transmitter 200. Here, the communication unit 213 may unicast, multicast, or broadcast the signal.

Further, the communication unit 213 may receive power information from the wireless power receiver 250. Here, the power information may include at least one of the capacity of the wireless power receiver 250, the remaining battery power level, the number of charging times, usage, battery capacity, and battery percentage.

The communication unit 213 may also transmit a charging function control signal for controlling a charging function of the wireless power receiver 250. The charging function control signal may be a control signal that controls a wireless power reception unit 251 of a specific wireless power receiver 250 to enable or disable the charging function.

The communication unit 213 may receive a signal not only from the wireless power receiver 250 but also from other wireless power transmitters (not shown).

Although FIG. 2 shows that the power transmission unit 211 and the communication unit 213 are configured as different pieces of hardware so that the wireless power transmitter 200 performs communication in an out-band format, this configuration is merely an example. In the present disclosure, the power transmission unit 211 and the communication unit 213 may be configured as one piece of hardware so that the wireless power transmitter 200 may perform communication in an in-band format.

The wireless power transmitter 200 and the wireless power receiver 250 may send and receive various signals, and accordingly the wireless power transmitter 200 may perform the access of the wireless power receiver 250 to a wireless power network and a charging process through wireless power transmission and reception.

The power reception unit 251 may receive wireless power from the power transmission unit 211 based on an inductive method or a resonant method.

Figure 3:
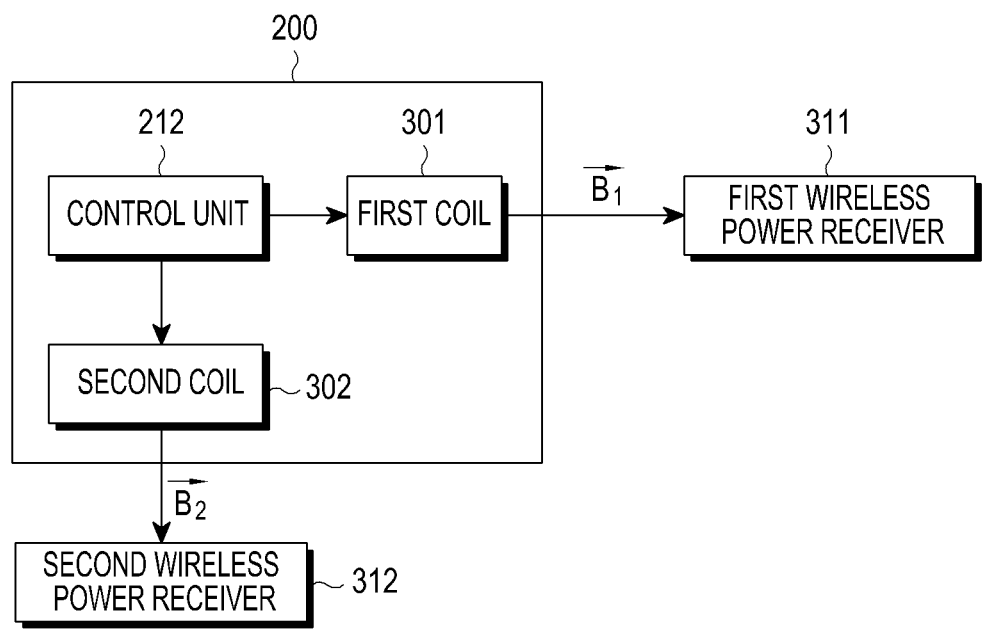
FIG. 3 is a block diagram illustrating a wireless power transmitter according to various embodiments of the present disclosure.

FIG. 3 is a block diagram illustrating a wireless power transmitter 200 according to various embodiments of the present disclosure.

As illustrated in FIG. 3, the wireless power transmitter 200 may include a control unit 212, a first coil 301, and a second coil 302. The control unit 212 may control the current to be applied to each of the first coil 301 and the second coil 302. The control unit 212 may apply a current from a driving unit (not shown) to the first coil 301 and the second coil 302. The control unit 212 may apply a current to only one coil of the first coil 301 and the second coil 302. For example, the control unit 212 may apply a current only to a coil where a mounted wireless power receiver is detected.

Each of the first coil 301 and the second coil 302 may include at least one sub-coil. The first coil 301 may generate a first magnetic field B1, and the magnetic field or an electromagnetic field from the first coil 301 may be transmitted to a first wireless power receiver 311. The second coil 302 may generate a second magnetic field B2, and the magnetic field or an electromagnetic field from the second coil 302 may be transmitted to a second wireless power receiver 312.

For example, the wireless power transmitter 200 may charge the first wireless power receiver 311 and the second wireless power receiver 312 based on a magnetic induction method. In this case, the first magnetic field B1 from the first coil 301 of the wireless power transmitter 200 may generate an induced current to a secondary coil of the first wireless power receiver 311, and thus the first wireless power receiver 311 may be wirelessly charged. Further, the second magnetic field B2 from the second coil 302 may generate an induced current to a secondary coil of the second wireless power receiver 312, and thus the second wireless power receiver 312 may be wirelessly charged.

Alternatively, the wireless power transmitter 200 may charge the first wireless power receiver 311 and the second wireless power receiver 312 based on a resonant method. In this case, an electromagnetic field including the first magnetic field B1 from the first coil 301 of the wireless power transmitter 200 and a first electric field corresponding to the first magnetic field B1 may be absorbed by a resonance circuit of the first wireless power receiver 311, and thus the first wireless power receiver 311 may be wirelessly charged. Further, an electromagnetic field including the second magnetic field B2 from the second coil 302 of the wireless power transmitter 200 and a second electric field corresponding to the second magnetic field B2 may be absorbed by a resonance circuit of the second wireless power receiver 312, and thus the second wireless power receiver 312 may be wirelessly charged.

As described above, the wireless power transmitter 200 according to various embodiments of the present disclosure may charge the first wireless power receiver 311 and the second wireless power receiver 312 based on a magnetic induction method or resonant method.

The first wireless power receiver 311 may be disposed in a first orientation on the wireless power transmitter 200. Here, "orientation" may be used as a term indicating the direction of a coil included in a wireless power receiver relative to a reference surface of the wireless power transmitter in the arrangement of the wireless power receiver on the wireless power transmitter 200. For example, a surface of the first wireless power receiver 311 on which a coil forms a loop may make a first angle with the reference surface of the wireless power transmitter 200, in which case the wireless power receiver 311 may be defined as being disposed in the first orientation on the wireless power transmitter 200. The wireless power receiver may be disposed in various orientations on the wireless power transmitter 200 depending on the housing type of a product. For example, a wireless power receiver including a housing that is substantially rectangular parallelepiped-shaped, such as a smartphone, may be disposed to form the first angle with the reference surface of the wireless power transmitter. When a wristwatch-type electronic device is disposed on a plane, an included coil may be disposed perpendicular to the plane. The second wireless power receiver 312, such as a wristwatch-type electronic device, may be disposed in a second orientation, which is different from the first orientation of the first wireless power receiver 311, on the wireless power transmitter 200.

In various embodiments of the present disclosure, the first magnetic field B1 generated from the first coil 301 of the wireless power transmitter 200 may be perpendicular to the surface on which the coil forms the loop in the first wireless power receiver 311 disposed in the first orientation. The second magnetic field B2 generated from the second coil 302 of the wireless power transmitter 200 may be perpendicular to the surface on which the coil forms the loop in the second wireless power receiver 312 disposed in the second orientation. That is, the wireless power transmitter 200 according to various embodiments of the present disclosure may include coils 301 and 302 capable of forming magnetic fields B1 and B2 in various directions in order to enable high-efficiency wireless charging of all wireless power receivers disposed in various orientations.

FIGS. 4A to 4G are conceptual views illustrating a wireless power transmitter according to various embodiments of the present disclosure.

Figure 4A:
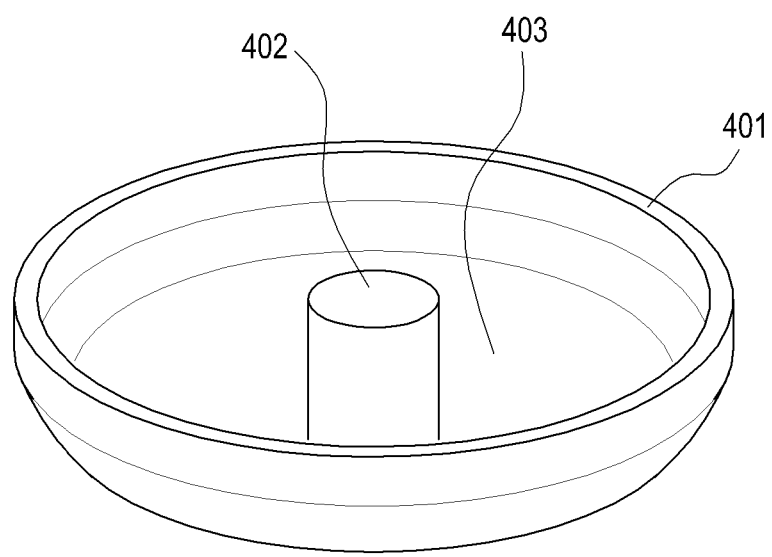
FIGS. 4A to 4G are conceptual views illustrating a wireless power transmitter according to various embodiments of the present disclosure.

Referring to FIG. 4A, the wireless power transmitter may include a first housing 401 having a bowl shape and a second housing 402 having a pillar shape. Although FIG. 4A shows that the first housing 401 is formed such that an internal side 403 is curved, this shape of the internal side 403 is merely an example. There is no restriction on the shape of the first housing 401 as long as it can provide a space for accommodating a wireless power receiver. The first housing 401 having the bowl shape has a structure such that the internal side 403 is recessed, and a wireless power receiver may be disposed on the internal side 403.

Figure 4B:
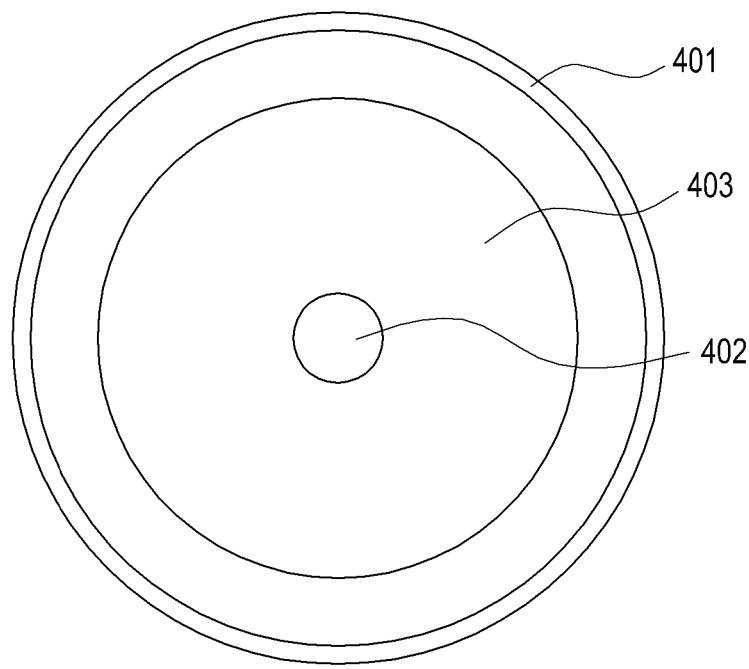

The second housing 402 may be connected to the internal side 403 of the first housing 401. FIG. 4B is a plan view of the wireless power transmitter according to various embodiments of the present disclosure. Although FIG. 4B shows that the second housing 402 is formed in a cylindrical shape at the center of the internal side 403, this shape is merely an example. There is no restriction on the position or the shape of the second housing 402 as long as it is formed in a pillar shape.

Figure 4C:
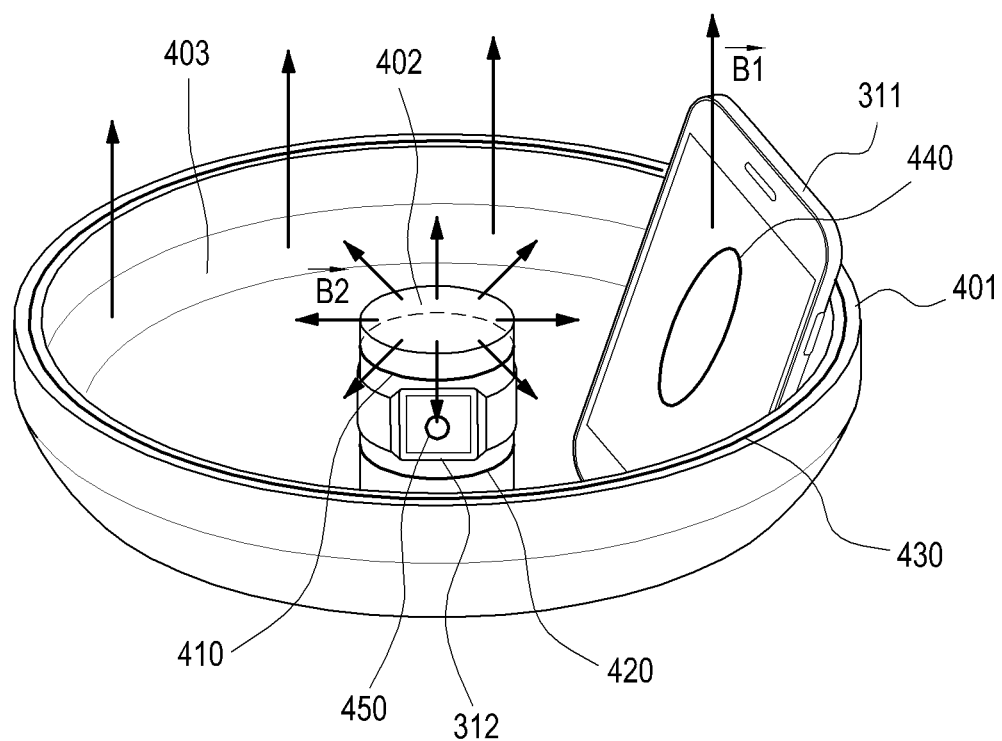

FIG. 4C is a conceptual view illustrating various types of wireless power receivers disposed on the wireless power transmitter.

As illustrated in FIG. 4C, a first wireless power receiver 311 may be accommodated in the internal side 403 of the first housing 401. Although it is shown that the first wireless power receiver 311 is mounted on a circumferential surface of the first housing 401, this is merely an example. The first wireless power receiver 311 may be disposed on the bottom of the internal side 403 of the first housing 401.

The circumferential surface of the first housing 401 may include a first coil 430. The wireless power transmitter may apply a current to the first coil 430, and the first coil 430 may induce a first magnetic field B1. When the wireless power transmitter performs wireless charging based on a magnetic induction method, an induced current may be applied to a secondary coil 440 of the wireless power receiver 311 by the first magnetic field B1 induced from the first coil 430, and accordingly the wireless power receiver 311 may perform wireless charging. Meanwhile, the wireless power transmitter may perform wireless charging based on a resonant method. In this case, the first coil 430 may be connected to at least one capacitor, and accordingly the wireless power transmitter may include a resonance circuit. The resonance circuit may generate an electromagnetic field including the first magnetic field B1 and a first electric field corresponding to the first magnetic field B1. The first wireless power receiver 311 may include a resonance circuit including the coil 440 and at least one capacitor connected to the coil 440. The resonance circuit of the first wireless power receiver 311 may have the same resonance frequency as that of the resonance circuit of the wireless power transmitter. The resonance circuit of the first wireless power receiver 311 may absorb the electromagnetic field from the wireless power transmitter, and accordingly may perform wireless charging.

The coil 440 of the first wireless power receiver 311 may be arranged to be substantially perpendicular to the first magnetic field B1. For example, when the first wireless power receiver 311 is disposed at the bottom of the internal side 403 of the first housing 401, the coil 440 of the first wireless power receiver 311 may be arranged to be substantially parallel to the first coil 430, and accordingly the first magnetic field B1 generated from the first coil 430 may be orthogonal to the coil 440 of the first wireless power receiver 311. When the angle between a coil at a wireless power receiver and an incident magnetic field is close to a right angle, the efficiency of wireless charging increases. Accordingly, the first wireless power receiver 311 may wirelessly receive power from the first coil 430 at relatively high charging efficiency. The recessed depth of the first housing 401 may be determined in view of wireless charging efficiency. As described above, as the recessed depth is smaller, the angle between the coil 440 of the first wireless power receiver 311 and the first magnetic field B1 may be closer to a right angle, thus increasing charging efficiency. On the other hand, when the recessed depth is small, the first wireless power receiver 311 may be relatively unstably accommodated. Accordingly, the recessed depth of the first housing 401 may be set in view of a trade-off between charging efficiency and the need to accommodate the wireless power receiver.

The second housing 402 may include second coils 410 and 420. Two sub-coils 410 and 420 may be spaced at a preset interval to be disposed parallel to each other along the circumferential surface of the second housing 402. The wireless power transmitter may apply a current to each of the two sub-coils 410, 420. Each of the two sub-coils 410 and 420 may induce a magnetic field based on the applied current, and the magnetic fields from the two respective sub-coils 410 and 420 may be summed. Accordingly, a radial second magnetic field B2 may be formed between the two sub-coils 410 and 420. The second magnetic field B2 may be formed in all directions in two dimensions from the center of the second housing 402. The detailed process in which the radial second magnetic field B2 is formed between the two sub-coils 410, 420 will be described in detail below.

A second wireless power receiver 312 may be mounted on the second housing 402. In various embodiments of the present disclosure, the second wireless power receiver 312 may be a wristwatch-type electronic device including a strap. A body part of the second wireless power receiver 312 may include a coil 450. The second wireless power receiver 312 may be mounted such that the strap encloses the second housing 402. Accordingly, the angle between the coil 450 of the second wireless power receiver 312 and the first coil 430 may be a substantially right angle. That is, the first magnetic field B1 generated from the first coil 430 may be parallel to the first coil 430, and thus charging efficiency may significantly decrease. The second wireless power receiver 312 may perform wireless charging using the second magnetic field B2. As described above, since the second magnetic field B2 may be radially formed from the second housing 402, the coil 450 of the second wireless power receiver 312 and the second magnetic field B2 may form a substantially right angle. Accordingly, the second wireless power receiver 312 may receive power from the wireless power transmitter at relatively high charging efficiency. That is, both when the coil 440 is disposed in a first orientation, as in the first wireless power receiver 311, and when the coil 450 is disposed in the second orientation, as in the second wireless power receiver 312, wireless charging may be performed at relatively high charging efficiency.

As described above, even though the first wireless power receiver 311 and the second wireless power receiver 312 are disposed in different orientations, the wireless power transmitter according to various embodiments of the present disclosure may wirelessly charge both wireless power receivers at relatively high charging efficiency.

Figure 4D:
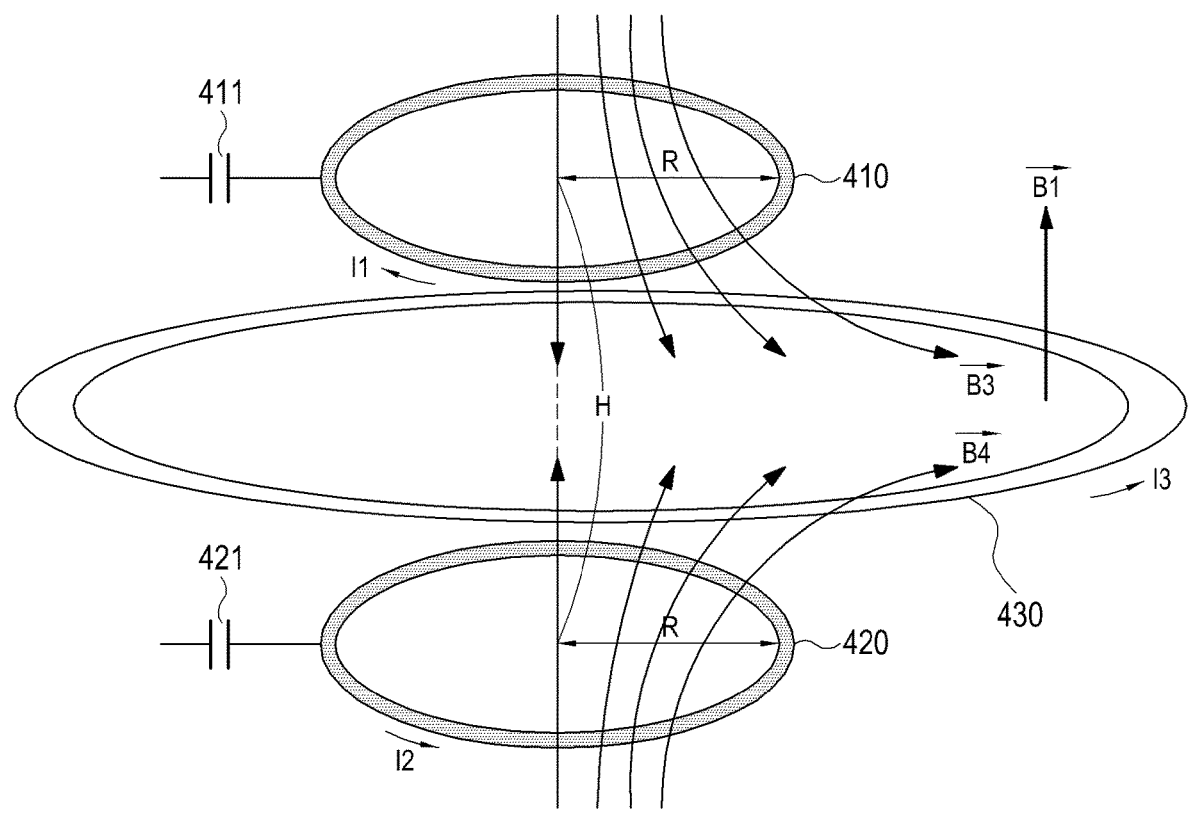

FIG. 4D is a conceptual view illustrating a coil according to various embodiments of the present disclosure.

As illustrated in FIG. 4D, the second coils may include the two sub-coils 410 and 420 disposed parallel to each other. The first sub-coil 410 may have a circular shape with a radius R. The second sub-coil 420 may have a circular shape with a radius R. Here, the first sub-coil 410 and the second sub-coil 420 may have the same shape. In another embodiment, the first sub-coil 410 and the second sub-coil 420 may have different shapes. Although the embodiment of FIG. 4D shows that the first sub-coil 410 and the second sub-coil 420 may each be a one-turn coil, this is merely an example. Each of the first sub-coil 410 and the second sub-coil 420 may be a multi-turn coil.

The first sub-coil 410 and the second sub-coil 420 may be spaced apart from each other by a distance H. Here, H may be determined depending on the size of the coil of the wireless power receiver. The length of one side of the coil of the wireless power receiver may be h1, in which case the wireless power transmitter may determine H to be h1. On the other hand, the wireless power receiver may include a coil having a length of one side of h2. For example, wireless power receivers may be classified into different categories depending on received power or consumed power. Wireless power receivers belonging to different categories may include coils of different sizes. The wireless power transmitter may receive category information from a wireless power receiver and may adjust the distance between the first sub-coil 410 and the second sub-coil 420 based on the category information. For example, when the length of one side of a coil of a wireless power receiver is h2, the wireless power transmitter may adjust H to h2. In this case, the wireless power transmitter may further include a motor (not shown) capable of adjusting the distance between the coils 410 and 420.

At least one capacitor 411 may be connected to the first sub-coil 410. At least one capacitor 421 may be connected to the second sub-coil 420. Although FIG. 4D shows one capacitor 411 and one capacitor 421, this is merely an example. Various connections of various numbers of capacitors may be possible depending on the wireless power transmission method or impedance matching.

The wireless power transmitter may apply a first current I1 to the first sub-coil 410 in a first direction during wireless power transmission. Although not shown, the wireless power transmitter may further include a power driver (not shown) capable of providing power and an inverter (not shown) that inverts DC power provided from the power driver (not shown) into AC power.

A magnetic field B3 may be formed around the first sub-coil 410 by the first current I1 in the first direction. The magnetic field B3 may be a magnetic field induced by the first current. The magnetic field B3 may have a downward direction at the center of the first sub-coil 410. In addition, as illustrated in FIG. 4D, the magnetic field B3 may be formed in a direction in which the magnetic field B3 is discharged to the outside in a lower area away from the center of the first sub-coil 410.

The wireless power transmitter may apply a second current I2 to the second sub-coil 420 in a second direction during wireless power transmission. Here, the second direction may be opposite the first direction. A magnetic field B4 may be formed around the second sub-coil 420 by the second current I2 in the second direction. The magnetic field B4 may be a magnetic field induced by the second current. The magnetic field B4 may have an upward direction at the center of the second sub-coil 420. In addition, as illustrated in FIG. 4D, the magnetic field B4 may be formed in a direction in which the magnetic field B4 is discharged to the outside in an upper area away from the center of the second sub-coil 420.

Accordingly, the magnetic fields B3 and B4 may be radially generated in the space between the first sub-coil 410 and the second sub-coil 420, and a wireless power receiver may receive power without restriction as to arrangement positions. A vector sum of the magnetic field B3 and the magnetic field B4 may be the second magnetic field B2 in FIG. 4C. Meanwhile, the wireless power transmitter including the first sub-coil 410 and the second sub-coil 420 may transmit power based on a resonant method or a magnetic induction method.

A third current I3 may be applied to the first coil 430, and accordingly the first magnetic field B1 may be induced. The first magnetic field B1 may be vertical to the ground and may thus be perpendicular to the second magnetic fields B3 and B4. As described above, the wireless power transmitter according to various embodiments of the present disclosure may form a plurality of magnetic fields perpendicular to each other, thus wirelessly charging various types of wireless power receiver disposed in various orientations at relatively high charging efficiency.

Figure 4E:
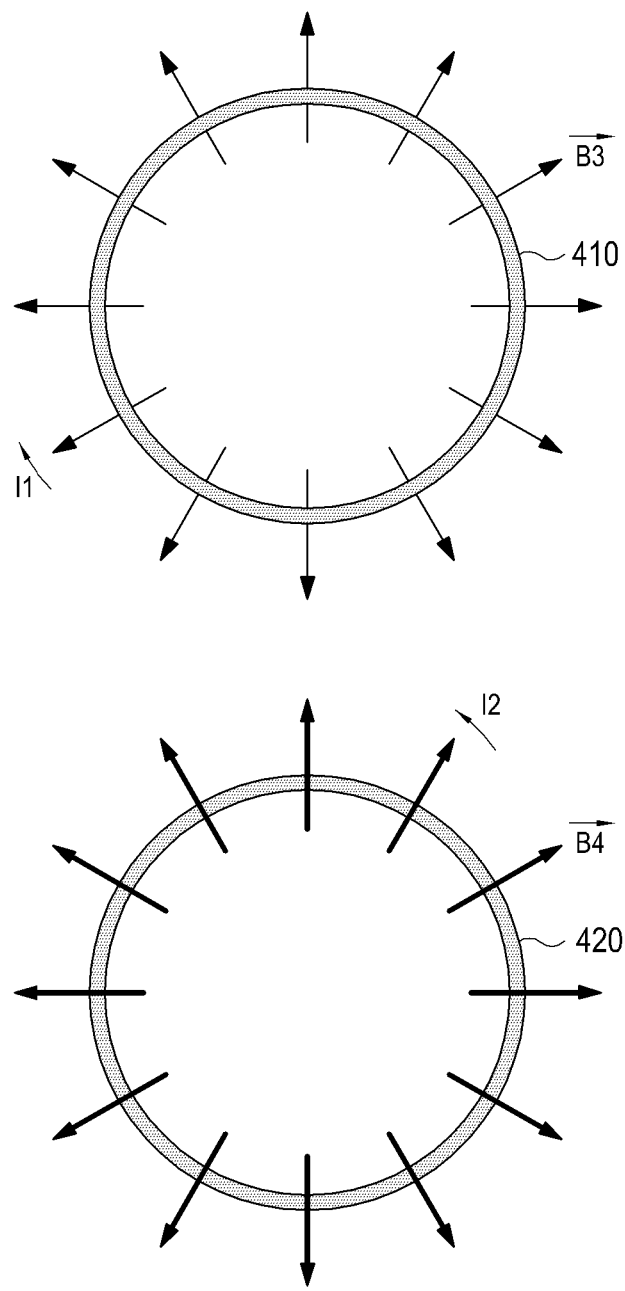

FIG. 4E is a plan view illustrating the first sub-coil 410 and the second sub-coil 420 according to various embodiments of the present disclosure. As illustrated in FIG. 4E, a first current I1 in a first direction may be applied to the first sub-coil 410. Accordingly, a radial magnetic field B3 may be induced under the first sub-coil 410. Specifically, the magnetic field B3 may be formed radially from the center of the first sub-coil 410 in a lower area around the first sub-coil 410. A second current I2 in a second direction may be applied to the second sub-coil 420. The second direction may be opposite the first direction. Accordingly, a radial magnetic field B4 may be induced over the second sub-coil 420. Specifically, the magnetic field B4 may be formed radially from the center of the second sub-coil 420 in an upper area around the second sub-coil 420.

A wireless power receiver may receive power from the wireless power transmitter even if the wireless power receiver is disposed anywhere outwards between the first sub-coil 410 and the second sub-coil 420. Thus, restriction on the arrangement position of a wireless power receiver may be eased.

Figure 4F:
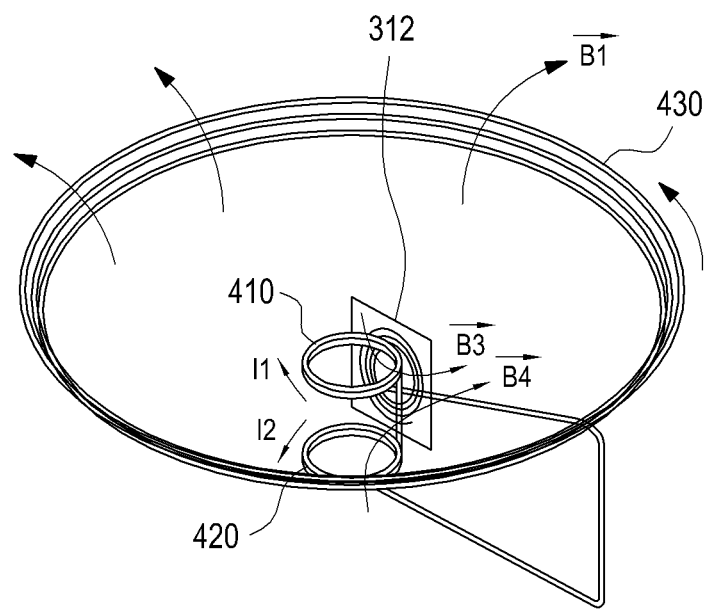

FIG. 4F is a conceptual view illustrating an embodiment of a coil according to various embodiments of the present disclosure.

As illustrated in FIG. 4F, the first sub-coil 410 and the second sub-coil 420 may be spaced apart at a predetermined interval so as to be disposed parallel to each other. In various embodiments of the present disclosure, the first sub-coil 410 and the second sub-coil 420 may be connected such that current flows in opposite directions in the first sub-coil 410 and the second sub-coil 420. Meanwhile, the first coil 430 may have a relatively larger radius than those of the first sub-coil 410 and the second sub-coil 420. The coil of the second wireless power receiver 312 may be disposed, for example, outwards between the first sub-coil 410 and the second sub-coil 420, as illustrated in FIG. 4F. As described above, since the radial magnetic field B2 is generated between the first sub-coil 410 and the second sub-coil 420, the coil of the second radio power receiver 312 may perform wireless charging using the vertically incident magnetic field B2.

Figure 4G:
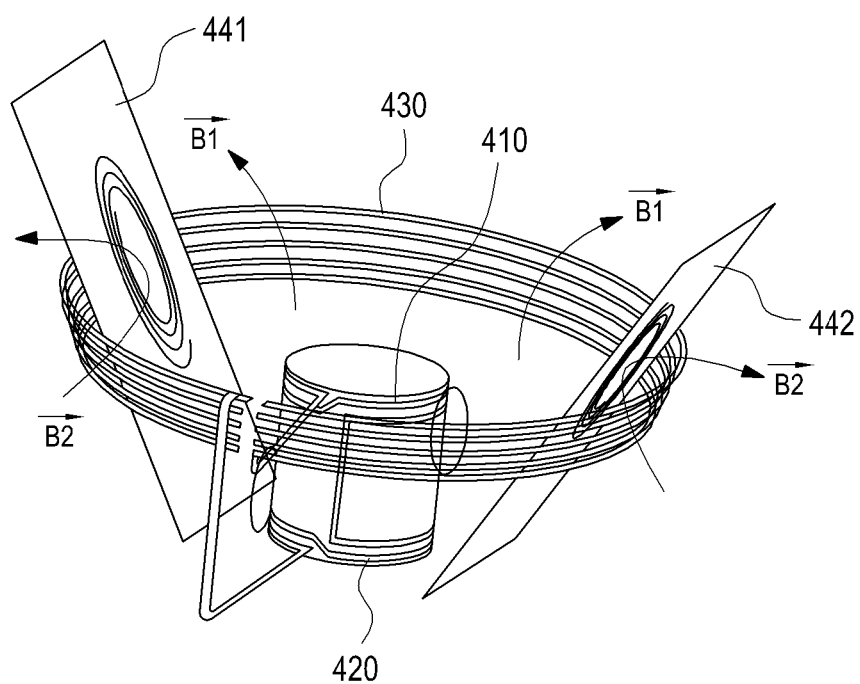

FIG. 4G is a conceptual view illustrating the arrangement of the first wireless power receiver according to various embodiments of the present disclosure. As illustrated in FIG. 4G, various coils 441 and 442 of the first wireless power receiver may be mounted on the first coil 430. A circular magnetic field B1 surrounding the wire of the coil may be formed in the internal vicinity of the first coil 430, and accordingly a second magnetic field B2 may be incident substantially vertically to the coils 441 and 442 mounted on the first coil 430. Thus, the coils 441 and 442 may perform wireless charging at relatively high charging efficiency.

Figure 5A:
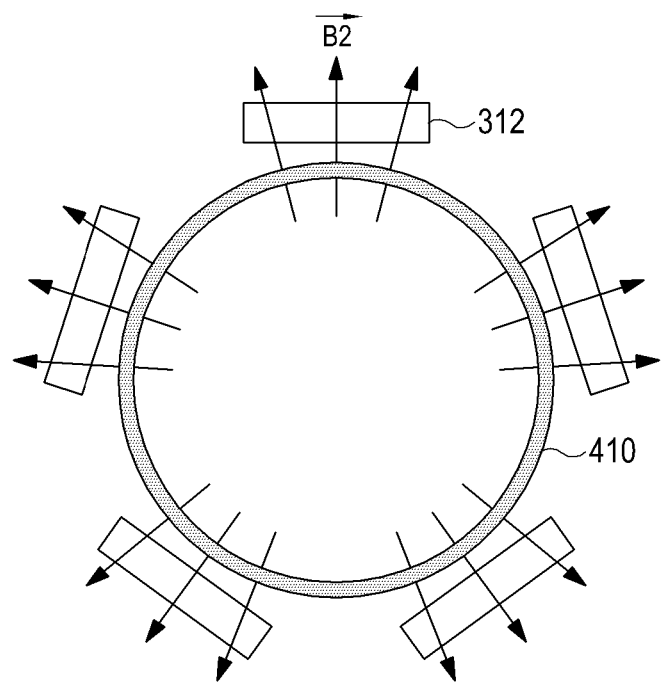
FIGS. 5A and 5B illustrate the arrangement of a wireless power receiver according to various embodiments of the present disclosure.
Figure 5B:
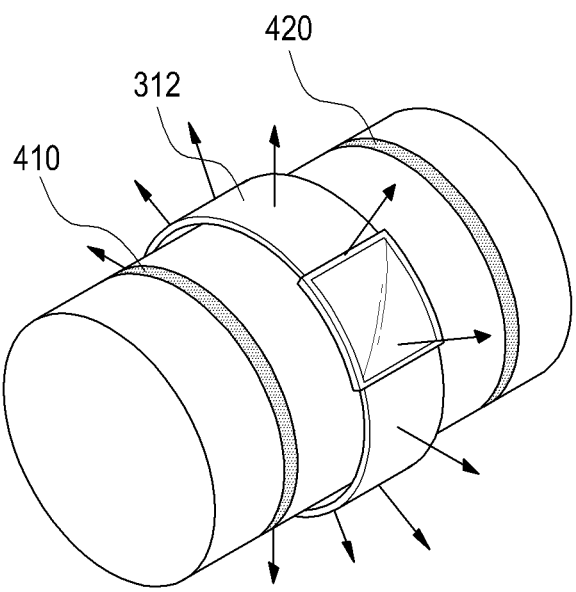

FIGS. 5A and 5B illustrate the arrangement of a wireless power receiver according to various embodiments of the present disclosure. As illustrated in FIGS. 5A and 5B, the wireless power receiver 312 may be disposed outwards between a first sub-coil 410 and a second sub-coil 420 of a wireless power transmitter. In one embodiment, the wireless power receiver 312 may be a watch-type wearable electronic device. In addition, the wireless power transmitter may include a housing in which the first sub-coil 410 and the second sub-coil 420 are disposed and on which the watch-type wearable electronic device may be mounted.

As illustrated in FIGS. 5A and 5B, the wireless power transmitter according to various embodiments of the present disclosure may generate a radial magnetic field. Thus, no matter where the wireless power receiver 312 is disposed, the wireless power receiver 312 may wirelessly receive power based on the generated magnetic field.

Figure 6A:
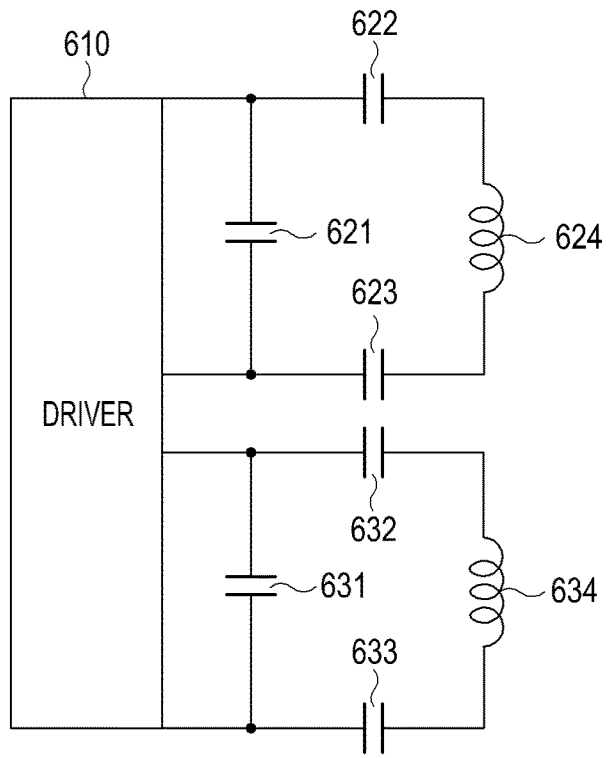
FIGS. 6A to 6C are circuit diagrams illustrating a power transmission unit according to various embodiments of the present disclosure.
Figure 6B:
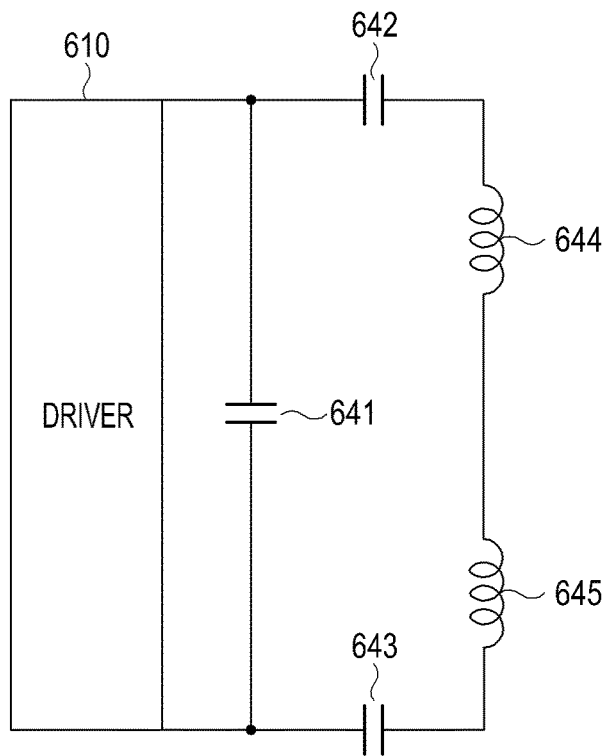
Figure 6C:
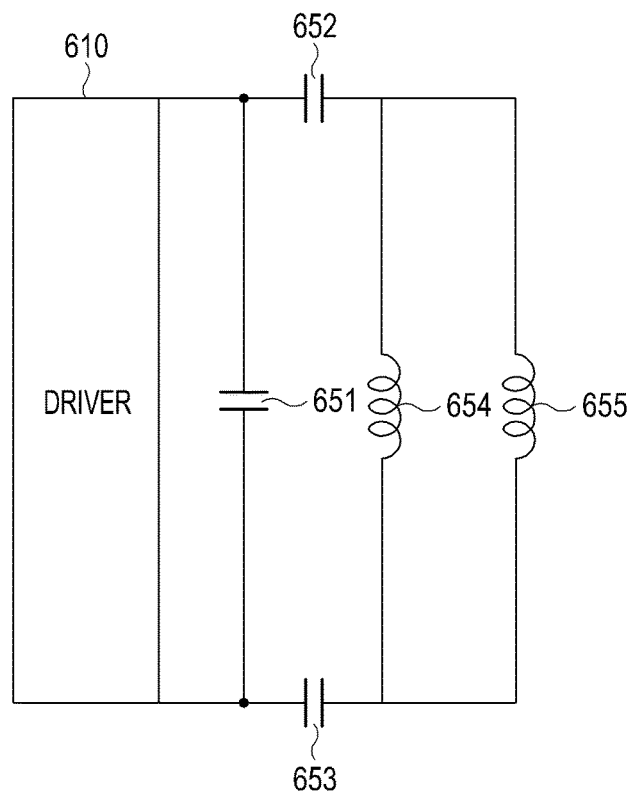

FIGS. 6A to 6C are circuit diagrams illustrating a power transmission unit according to various embodiments of the present disclosure. The circuit diagrams of FIGS. 6A to 6C may be circuit diagrams of a power transmission unit employing an inductive method, presented by way of example.

The power transmission unit according to FIGS. 6A to 6C may transmit wireless power of a first frequency. The first frequency may be, for example, 100 to 200 kHz. The power transmission unit may include at least one capacitor and at least one coil in order to efficiently transmit the wireless power of the first frequency. The capacitance and the inductance of each of the at least one capacitor and the at least one coil included in the power transmission unit may be determined corresponding to the first frequency. Specifically, the capacitance and the inductance may be determined such that a frequency in an odd mode according to the coil and the capacitor included in the power transmission unit is the first frequency. Meanwhile, although not shown, the power transmission unit may further include a matching element capable of performing impedance matching, which serves to achieve high-output or high-efficiency power transmission.

Here, "odd mode" refers to the case where currents respectively applied to two sub-coils 624 and 634 are in opposite directions, and "even mode" refers to the case where currents respectively applied to the two sub-coils 624 and 634 are in the same direction. In an embodiment of the present disclosure, the currents respectively applied to the two sub-coils 624 and 634 may be in opposite directions, and thus the frequency in the odd mode may be determined. The frequency in the odd mode may be determined using Equation 1. The reactances of the sub-coils 624 and 634 may be L1 and L2. Meanwhile, it is assumed that at least one capacitor is connected to each of the two sub-coils 624 and 634 so that two resonators are formed. In addition, the wireless power transmitter may additionally include a resistor having a resistance value R.

$$\omega_{odd} = \text{Imaginary term of } j\frac{\omega_1 + \omega_2}{2} - \frac{\Gamma_1 + \Gamma_2}{2} + j\sqrt{\left(\frac{\omega_1 - \omega_2}{2} - j\frac{\Gamma_1 - \Gamma_2}{2}\right)^2 + \left(\frac{\omega_1 + \omega_2}{4}\right)^2 k^2} \quad \text{[Equation 1]}$$

In Equation 1, ω1 is an angular frequency corresponding to a resonance frequency f1, determined by the first sub-coil 624 and at least one capacitor, which may be 2πf1. ω2 is an angular frequency corresponding to a resonance frequency f2, determined by the second sub-coil 634 and at least one capacitor, which may be 2πf2. In addition, Γ1 may be $$\frac{\omega 1}{2Q1},$$

and Γ2 may be $$\frac{\omega 2}{2Q2}.$$

Further, Q1 may be $$\frac{w1L1}{R},$$

and Q2 may be $$\frac{w2L2}{R}.$$

Meanwhile, k may be $$\frac{M}{\sqrt{L1L2}},$$

and M may be a coefficient of mutual induction between the first sub-coil 624 and the second sub-coil 634.

When Q is a number greater than 1, the frequency in the odd mode may be represented by Equation 2.

$$\omega_{odd}|_{Q\gg1} = \frac{\omega_1+\omega_2}{2} + j\sqrt{\left(\frac{\omega_1-\omega_2}{2}\right)^2 + \left(\frac{\omega_1+\omega_2}{4}\right)^2 k^2} \quad \text{[Equation 2]}$$

The wireless power transmitter may have the element values of the sub-coils 624 and 634, the capacitor, and the resistor such that the frequency in the odd mode is 6.78 MHz, defined in the resonant method. In another embodiment, the wireless power transmitter may have element values of the sub-coils 624 and 634, the capacitor, and the resistor such that the frequency in the odd mode ranges from 100 to 200 kHz, defined in the inductive method.

Meanwhile, the frequency in the even mode may be represented by Equation 3.

$$\omega_{even} = \text{Imaginary term of } j\frac{\omega_1+\omega_2}{2} - \frac{\Gamma_1+\Gamma_2}{2} - \quad \text{[Equation 3]}$$
$$j\sqrt{\left(\frac{\omega_1-\omega_2}{2} - j\frac{\Gamma_1-\Gamma_2}{2}\right)^2 + \left(\frac{\omega_1+\omega_2}{4}\right)^2 k^2}$$

A resonance frequency corresponding to an angular frequency (ωdd) in the odd mode may be f1. A resonance frequency corresponding to an angular frequency (ωeven) in the even mode may be f2. Meanwhile, f0 may be a resonance frequency corresponding to a single sub-coil 624 and at least one capacitor. For example, the resonance frequency f1 in the odd mode may be smaller than f0, and the resonance frequency f2 in the even mode may be greater than f0.

First, referring to FIG. 6A, a driver 610 may provide power for wireless transmission. As described above, the wireless power transmitter may further include an inverter (not shown) that inverts and outputs a DC current input from the driver 610. One end and the other end of a first capacitor 621 may be connected to the driver 610. One end of a second capacitor 622 may be connected to one end of the first capacitor 621 and the other end of the second capacitor 622 may be connected to one end of a first sub-coil 624. The other end of the first sub-coil 624 may be connected to the other end of a third capacitor 623. One end of the third capacitor 623 may be connected to end of the first capacitor 621.

One end and the other end of a fourth capacitor 631 may be connected to the driver 610. One end of a fifth capacitor 632 may be connected to one end of the fourth capacitor 631 and the other end of the fifth capacitor 632 may be connected to one end of a second sub-coil 634. The other end of the second sub-coil 634 may be connected to the other end of a sixth capacitor 633. One end of the sixth capacitor 633 may be connected to one end of the fourth capacitor 631.

That is, in the embodiment of FIG. 6A, the first sub-coil 624 may be connected to the corresponding first capacitor 621, second capacitor 622, and third capacitor 623. In addition, the second sub-coil 634 may be connected to the corresponding fourth capacitor 631, fifth capacitor 632, and sixth capacitor 633. In other words, the first sub-coil 624 and the second sub-coil 634 may include separate capacitors.

In one embodiment, the first sub-coil 624 and the second sub-coil 634 may be disposed parallel to each other, as in FIG. 3.

FIG. 6B illustrates an embodiment in which a first sub-coil 644 and a second sub-coil 645 are connected to a common capacitor. Referring to FIG. 6B, a driver 610 may provide power for wireless transmission. As described above, the wireless power transmitter may further include an inverter (not shown) that inverts and outputs a DC current input from the driver 610. One end and the other end of a first capacitor 641 may be connected to the driver 610. One end of a second capacitor 642 may be connected to one end of the first capacitor 641, and the other end of the second capacitor 642 may be connected to one end of the first sub-coil 644. The other end of the first sub-coil 644 may be connected to one end of the second sub-coil 645. The other end of the second sub-coil 645 may be connected to the other end of a third capacitor 643. One end of the third capacitor 643 may be connected to one end of the first capacitor 641.

That is, in the embodiment of FIG. 6B, the first sub-coil 644 and the second sub-coil 645 may be connected to the first capacitor 641, the second capacitor 642, and the third capacitor 643. In other words, the first sub-coil 644 and the second sub-coil 645 may share capacitors.

In one embodiment, the first sub-coil 644 and the second sub-coil 645 may be connected to each other in series and may be disposed parallel to each other as shown in FIG. 3.

FIG. 6C illustrates an embodiment in which a first sub-coil 654 and a second sub-coil 655 are connected to a common capacitor. Referring to FIG. 6C, a driver 610 may provide power for wireless transmission. As described above, the wireless power transmitter may further include an inverter (not shown) that inverts and outputs a DC current input from the driver 610. One end and the other end of a first capacitor 651 may be connected to the driver 610. One end of a second capacitor 652 may be connected to one end of the first capacitor 651 and the other end of the second capacitor 652 may be connected to one end of the first sub-coil 654 and one end of the second sub-coil 655. The other end of the first sub-coil 654 may be connected to one end of a third capacitor 653. The other end of the second sub-coil 655 may be connected to the other end of the third capacitor 653. One end of the third capacitor 653 may be connected to the other end of the first capacitor 651.

That is, in the embodiment of FIG. 6C, the first sub-coil 654 and the second sub-coil 655 may be connected to the first capacitor 651, the second capacitor 652, and the third capacitor 653. In other words, the first sub-coil 654 and the second sub-coil 655 may share capacitors.

In one embodiment, the first sub-coil 654 and the second sub-coil 655 may be connected to each other in parallel and may be disposed, for example, parallel to each other.

Figure 7A:
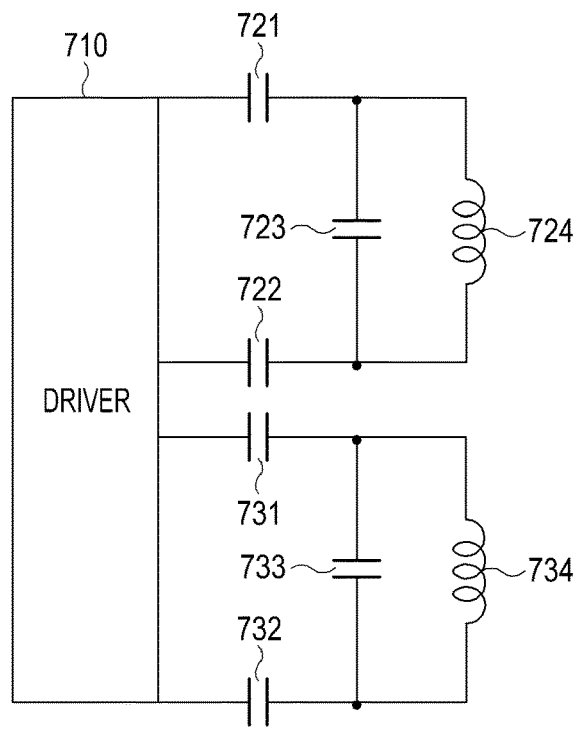
FIGS. 7A to 7C are circuit diagrams illustrating a power transmission unit according to various embodiments of the present disclosure.
Figure 7B:
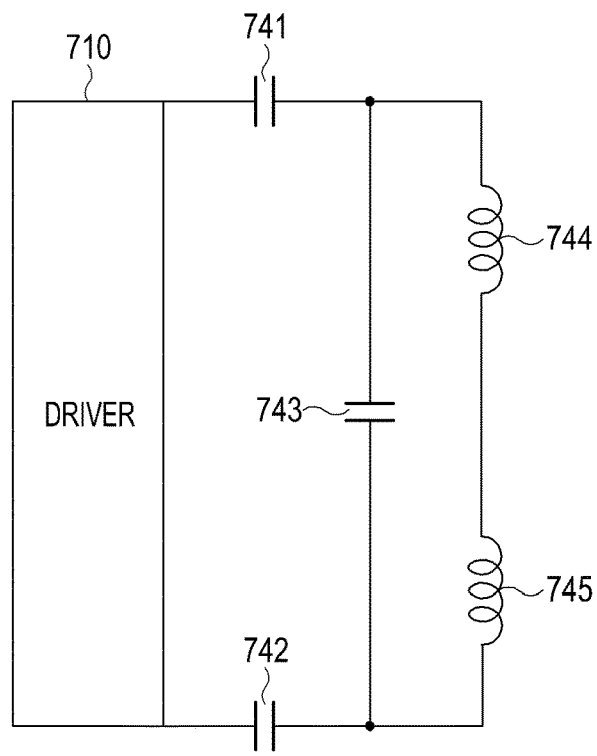
Figure 7C:
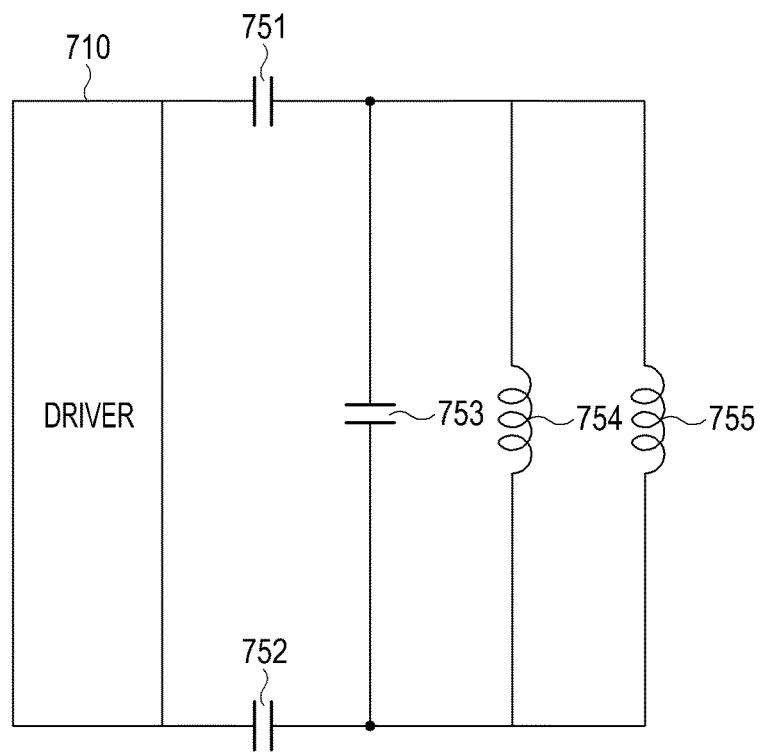

FIGS. 7A to 7C are circuit diagrams illustrating a power transmission unit according to various embodiments of the present disclosure. The circuit diagrams of FIGS. 7A to 7C may be circuit diagrams of a power transmission unit employing a resonant method, presented by way of example.

The power transmission unit according to FIGS. 7A to 7C may transmit wireless power of a second frequency. The second frequency may be, for example, 6.78 MHz. The power transmission unit may include at least one capacitor and at least one coil in order to efficiently transmit the wireless power of the second frequency. The capacitance and the inductance of each of the at least one capacitor and the at least one coil included in the power transmission unit may be determined corresponding to the second frequency. Specifically, the capacitance and the inductance may be determined such that a frequency in an odd mode according to the coil and the capacitor included in the power transmission unit is the second frequency. Meanwhile, although not shown, the power transmission unit may further include a matching element capable of performing impedance matching, which serves to achieve high-output or high-efficiency power transmission.

First, referring to FIG. 7A, a driver 710 may provide power for wireless transmission. As described above, the wireless power transmitter may further include an inverter (not shown) that inverts and outputs a DC current input from the driver 710. One end of a first capacitor 721 may be connected to the driver 710. One end of a second capacitor 722 may be connected to the driver 710. One end of a third capacitor 723 may be connected to the other end of the first capacitor 721. The other end of the third capacitor 723 may be connected to the other end of the second capacitor 722. One end of a first sub-coil 724 may be connected to the other end of the first capacitor 721 and one end of the third capacitor 723. The other end of the first sub-coil 724 may be connected to the other end of the second capacitor 722 and the other end of the third capacitor 723.

One end of a fourth capacitor 731 may be connected to the driver 710. One end of a fifth capacitor 732 may be connected to the driver 710. One end of a sixth capacitor 733 may be connected to the other end of the fourth capacitor 731. The other end of the sixth capacitor 733 may be connected to the other end of the fifth capacitor 732. One end of a second sub-coil 734 may be connected to the other end of the fourth capacitor 731 and one end of the sixth capacitor 733. The other end of the second sub-coil 734 may be connected to the other end of the fifth capacitor 732 and the other end of the sixth capacitor 733.

That is, in the embodiment of FIG. 7A, the first sub-coil 724 may be connected to the corresponding first capacitor 721, second capacitor 722, and third capacitor 723. In addition, the second sub-coil 734 may be connected to the corresponding fourth capacitor 731, fifth capacitor 732, and sixth capacitor 733. In other words, the first sub-coil 724 and the second sub-coil 734 may include separate capacitors.

In one embodiment, the first sub-coil 724 and the second sub-coil 734 may be disposed parallel to each other, as shown in FIG. 3.

FIG. 7B illustrates an embodiment in which a first sub-coil 744 and a second sub-coil 745 are connected to a common capacitor. Referring to FIG. 7B, a driver 710 may provide power for wireless transmission. As described above, the wireless power transmitter may further include an inverter (not shown) that inverts and outputs a DC current input from the driver 710.

One end of a first capacitor 741 may be connected to the driver 710. One end of a second capacitor 742 may be connected to the driver 710. One end of a third capacitor 743 may be connected to the other end of the first capacitor 741. The other end of the third capacitor 743 may be connected to the other end of the second capacitor 742. One end of the first sub-coil 744 may be connected to the other end of the first capacitor 741 and one end of the third capacitor 743. The other end of the first sub-coil 744 may be connected to one end of the second sub-coil 745. The other end of the second sub-coil 745 may be connected to the other end of the second capacitor 742 and the other end of the third capacitor 743.

That is, in the embodiment of FIG. 7B, the first sub-coil 744 and the second sub-coil 745 may be connected to the first capacitor 741, the second capacitor 742, and the third capacitor 743. In other words, the first sub-coil 744 and the second sub-coil 745 may share capacitors.

In one embodiment, the first sub-coil 744 and the second sub-coil 745 may be connected to each other in series and may be disposed parallel to each other, as shown in FIG. 3.

FIG. 7C illustrates an embodiment in which a first sub-coil 754 and a second sub-coil 755 are connected to a common capacitor.

Referring to FIG. 7C, a driver 710 may provide power for wireless transmission. As described above, the wireless power transmitter may further include an inverter (not shown) that inverts and outputs a DC current input from the driver 710.

One end of a first capacitor 751 may be connected to the driver 710. One end of a second capacitor 752 may be connected to the driver 710. One end of a third capacitor 753 may be connected to the other end of the first capacitor 751. The other end of the third capacitor 753 may be connected to the other end of the second capacitor 752. One end of the first sub-coil 754 may be connected to the other end of the first capacitor 751 and one end of the third capacitor 753. The other end of the first sub-coil 754 may be connected to the other end of the second capacitor 752 and the other end of the third capacitor 753. One end of the second sub-coil 755 may be connected to the other end of the first capacitor 751 and one end of the third capacitor 753. The other end of the second sub-coil 755 may be connected to the other end of the second capacitor 752 and the other end of the third capacitor 753.

That is, in the embodiment of FIG. 7C, the first sub-coil 754 and the second sub-coil 755 may be connected to the first capacitor 741, the second capacitor 742, and the third capacitor 743. In other words, the first sub-coil 754 and the second sub-coil 755 may share capacitors.

In one embodiment, the first sub-coil 754 and the second sub-coil 755 may be connected to each other in parallel and may be disposed, for example, parallel to each other.

Figure 8A:
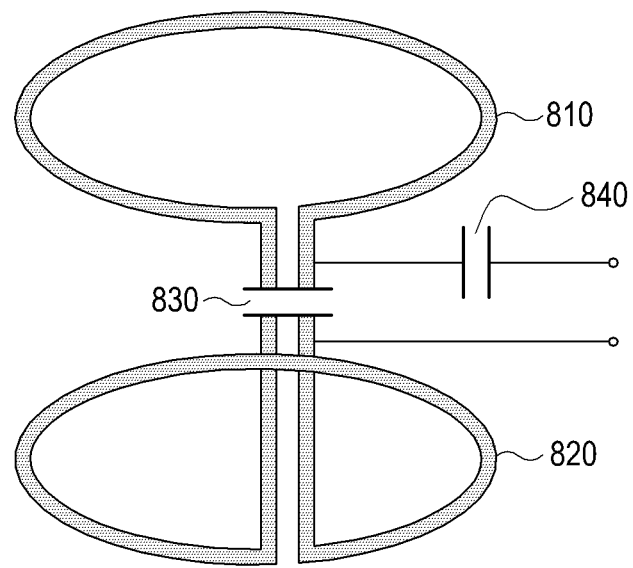
FIGS. 8A to 8C are conceptual views illustrating the connection between a coil and a capacitor according to various embodiments of the present disclosure.
Figure 8B:
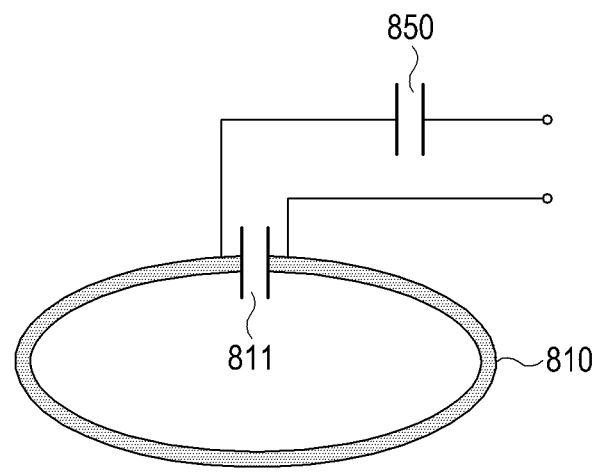
Figure 8B:
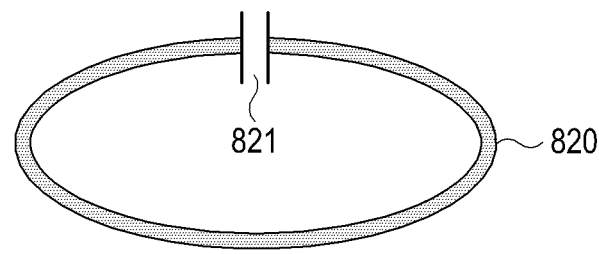
Figure 8C:
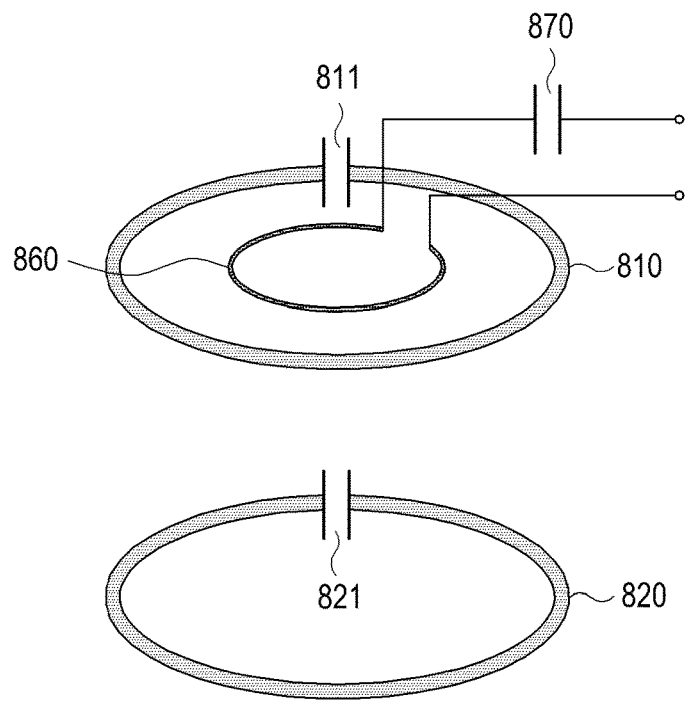

FIGS. 8A to 8C are conceptual views illustrating the connection between a coil and a capacitor according to various embodiments of the present disclosure.

Referring to FIG. 8A, a first sub-coil 810 and a second sub-coil 820 may be disposed parallel to each other. The first sub-coil 810 and the second sub-coil 820 may be connected to each other in series.

The first sub-coil 810 and the second sub-coil 820 may be connected to a capacitor 830 in order to configure a resonance circuit. In one embodiment, the first sub-coil 810 and the second sub-coil 820 may share the capacitor 830 for configuring a resonance circuit. The first sub-coil 810 and the shared capacitor 830 may be designed such that a resonance frequency is, for example, f0. In addition, the second sub-coil 820 and the shared capacitor 830 may be designed such that a resonance frequency is, for example, f0. For example, the reactance of the first sub-coil 810 may be the same as that of the second sub-coil 820, so that resonance frequencies corresponding to the respective coils may be the same. However, this is merely an example, and the reactance of the first sub-coil 810 may be different from that of the second sub-coil 820.

Currents flowing in opposite directions may be applied to the first sub-coil 810 and the second sub-coil 820, and thus the overall resonance frequency may be, for example, a frequency in the odd mode represented by Equation 1. The reactance of the first sub-coil 810, the reactance of the second sub-coil 820, and the capacitance of the shared capacitor 830 may be designed such that the frequency in the odd mode is a frequency defined in the inductive method or the resonant method.

An additional capacitor 840 for power supply from a driver (not shown) may be connected in parallel to the first sub-coil 810 and the second sub-coil 820.

Referring to FIG. 8B, a first sub-coil 810 and a second sub-coil 820 may be disposed parallel to each other. The first sub-coil 810 and the second sub-coil 820 may be connected to each other in parallel or may not be connected to each other.

The first sub-coil 810 and the second sub-coil 820 may be connected to respective capacitors 811 and 821 in order to configure a resonance circuit. The first sub-coil 810 and the capacitor 811 may be designed such that a resonance frequency is, for example, f0. In addition, the second sub-coil 820 and the capacitor 821 may be designed such that a resonance frequency is, for example, f0. For example, the reactance of the first sub-coil 810 may be the same as that of the second sub-coil 820, so that resonance frequencies corresponding to the respective coils may be the same. However, this is merely an example, and the reactance of the first sub-coil 810 may be different from that of the second sub-coil 820.

Currents flowing in opposite directions may be applied to the first sub-coil 810 and the second sub-coil 820, and thus the overall resonance frequency may be, for example, a frequency in the odd mode represented by Equation 1. The reactance of the first sub-coil 810, the reactance of the second sub-coil 820, the capacitance of the capacitor 811, and the capacitance of the capacitor 821 may be designed such that the frequency in the odd mode is a frequency defined in the inductive method or the resonant method.

An additional capacitor 850 for power supply from a driver (not shown) may be connected in parallel to the first sub-coil 810.

When the first sub-coil 810 and the second sub-coil 820 are connected in parallel, current input to the first sub-coil 810 may be applied to the second sub-coil 820. When the first sub-coil 810 and the second sub-coil 820 are not connected to each other, an induced electromotive force may also be generated in the second sub-coil 820 by a magnetic field induced by the first sub-coil 810. When a current is applied to the first sub-coil 810 in a first direction, an electromotive force in a second direction, which is opposite the first direction, may be induced in the second sub-coil 820. Thus, a frequency in the odd mode may be formed with respect to the first sub-coil 810 and the second sub-coil 820.

Referring to FIG. 8C, a first sub-coil 810 and a second sub-coil 820 may be disposed parallel to each other. The first sub-coil 810 and the second sub-coil 820 may be connected to each other in parallel or may not be connected to each other.

The first sub-coil 810 and the second sub-coil 820 may be connected to respective capacitors 811 and 821 in order to configure a resonance circuit. The first sub-coil 810 and the capacitor 811 may be designed such that a resonance frequency is, for example, f0. In addition, the second sub-coil 820 and the capacitor 821 may be designed such that a resonance frequency is, for example, f0. For example, the reactance of the first sub-coil 810 may be the same as that of the second sub-coil 820, so that resonance frequencies corresponding to the respective coils may be the same. However, this is merely an example, and the reactance of the first sub-coil 810 may be different from that of the second sub-coil 820.

Currents flowing in opposite directions may be applied to the first sub-coil 810 and the second sub-coil 820, and thus the overall resonance frequency may be, for example, a frequency in the odd mode represented by Equation 1. The reactance of the first sub-coil 810, the reactance of the second sub-coil 820, the capacitance of the capacitor 811, and the capacitance of the capacitor 821 may be designed such that the frequency in the odd mode is a frequency defined in the inductive method or the resonant method.

Meanwhile, a wireless power transmitter may include an additional coil 860 and an additional capacitor 870 for power supply from a driver (not shown). The driver may apply current to the additional coil 860 and the additional capacitor 870. The additional coil 860 may generate a magnetic field based on the applied current. An induced electromotive force may be generated in the first sub-coil 810 by the magnetic field generated by the additional coil 860.

When the first sub-coil 810 is connected in parallel to the second sub-coil 820, the current formed in the first sub-coil 810 may be applied to the second sub-coil 820. When the first sub-coil 810 and the second sub-coil 820 are not connected to each other, an induced electromotive force may also be generated in the second sub-coil 820 by a magnetic field induced by the first sub-coil 810. When current is applied to the first sub-coil 810 in a first direction, an electromotive force in a second direction, which is opposite the first direction, may be induced in the second sub-coil 820. Thus, a frequency in the odd mode may be formed with respect to the first sub-coil 810 and the second sub-coil 820.

Figure 9:
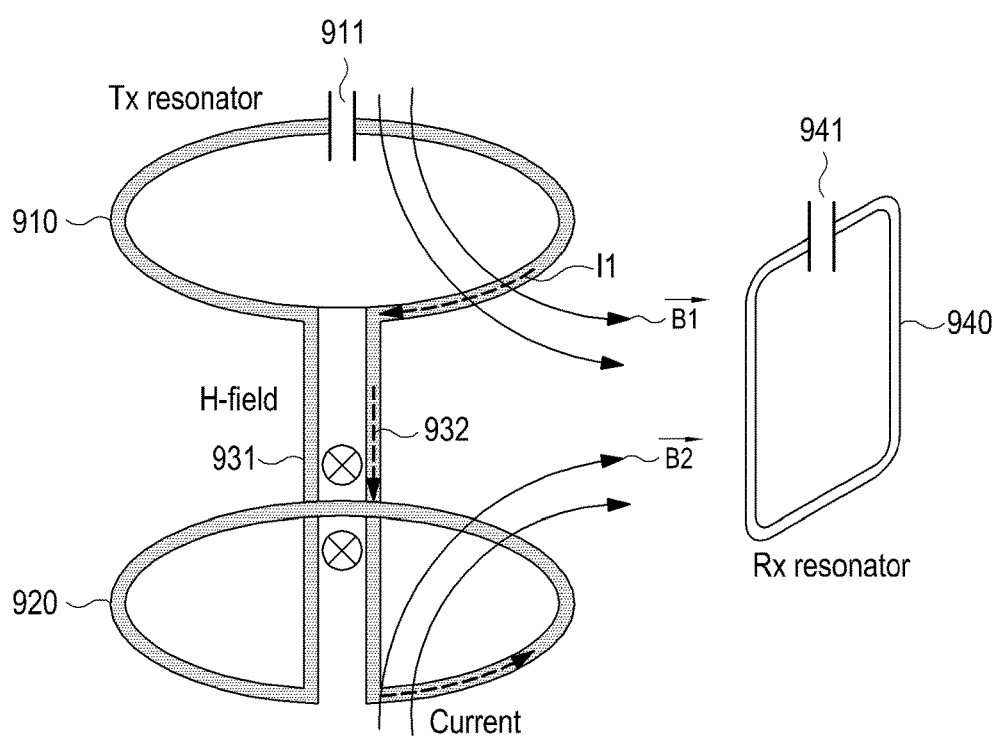
FIG. 9 is a conceptual view illustrating a power transmission unit according to various embodiments of the present disclosure.

FIG. 9 is a conceptual view illustrating a power transmission unit according to various embodiments of the present disclosure.

As illustrated in FIG. 9, the power transmission unit may include a loop including a first sub-loop 910 and a second sub-loop 920. Here, the first sub-loop 910 has a substantially circular shape but may not be a closed loop. Also, the second sub-loop 920 has a substantially circular shape but may not be a closed loop. The first sub-loop 910 may be connected to the second sub-loop 920. In detail, conductive connection wires 931 and 932 may connect the first sub-loop 910 and the second sub-loop 920. The conductive connection wires 931 and 932 may be disposed in a direction vertical to a loop-forming surface of the sub-loops 910 and 920.

A driver (not shown) may apply a current I1 in a first direction to the first sub-loop 910. The current I1 may be applied via the conductive connection wire 932 to the second sub-loop 920. The current I1 may be applied in a second direction, which is opposite the first direction, in the second sub-loop 920. Accordingly, the first sub-loop 910 and the second sub-loop 920 may mutually form an odd mode.

A capacitor 911 may be connected to the first sub-loop 910 and the second sub-loop 920. Accordingly, the first sub-loop 910 and the capacitor 911 may form a resonance circuit, and the second sub-loop 920 and the capacitor 911 may form a resonance circuit. Here, the resonance circuit corresponding to the first sub-loop 910 and the resonance circuit corresponding to the second sub-loop 920 may each have a resonance frequency of f0. In various embodiments, the resonance frequencies may be different. Accordingly, the resonance frequency of the entire loop may be, for example, a resonance frequency in the odd mode represented by Equation 1.

In the embodiment of FIG. 9, the power transmission unit may transmit wireless power according to an inductive method or a resonant method, in which the reactances of the sub-loops 910 and 920 and the capacitance of the capacitor 911 may be designed such that the resonance frequency in the odd mode ranges from 100 to 200 kHz or is 6.78 MHz.

Accordingly, a radial magnetic field may be generated in an area between the sub-loops 910 and 920, except for the area between the conductive connection wires 931 and 932. A wireless power receiver may include a power reception unit including a coil 940 and a capacitor 941. The wireless power receiver may wirelessly receive power when disposed in an area other than the area between the conductive connection wires 931 and 932.

Figure 10A:
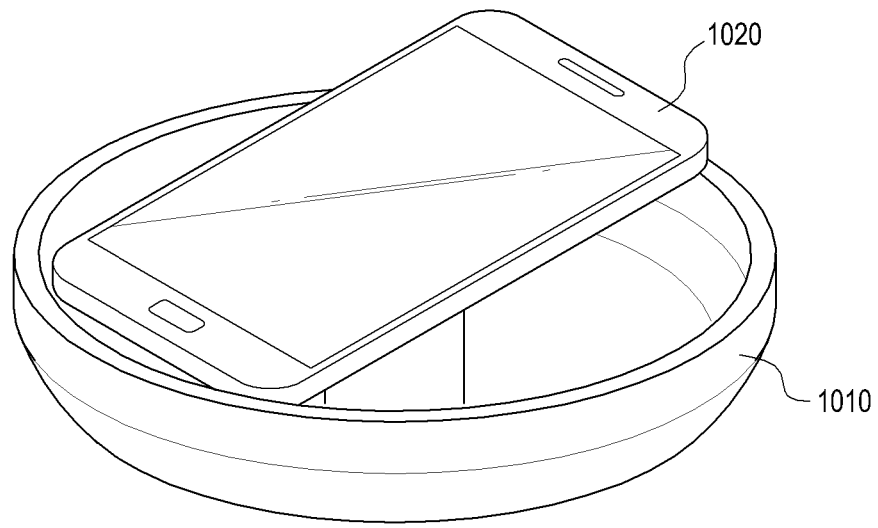
FIGS. 10A to 10C are conceptual views illustrating a wireless power transmitter according to various embodiments of the present disclosure.
Figure 10B:
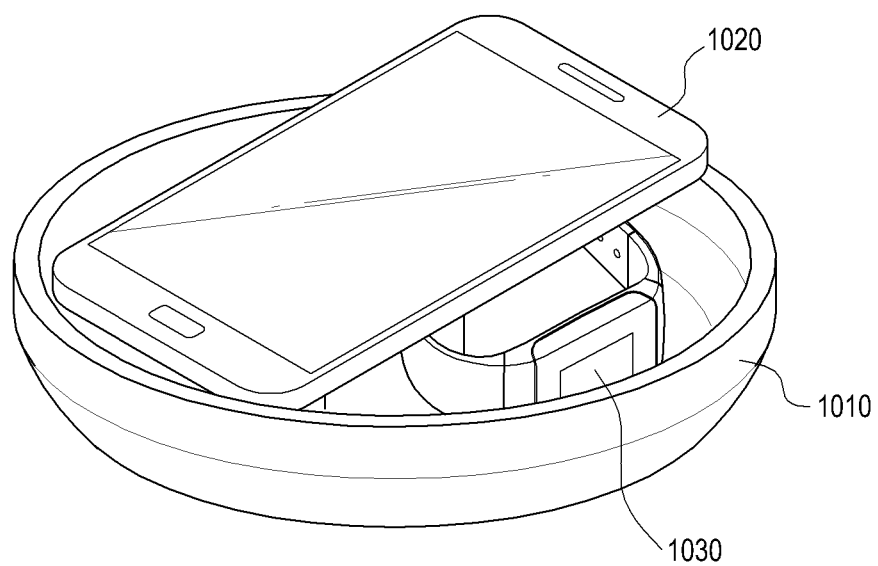
Figure 10C:
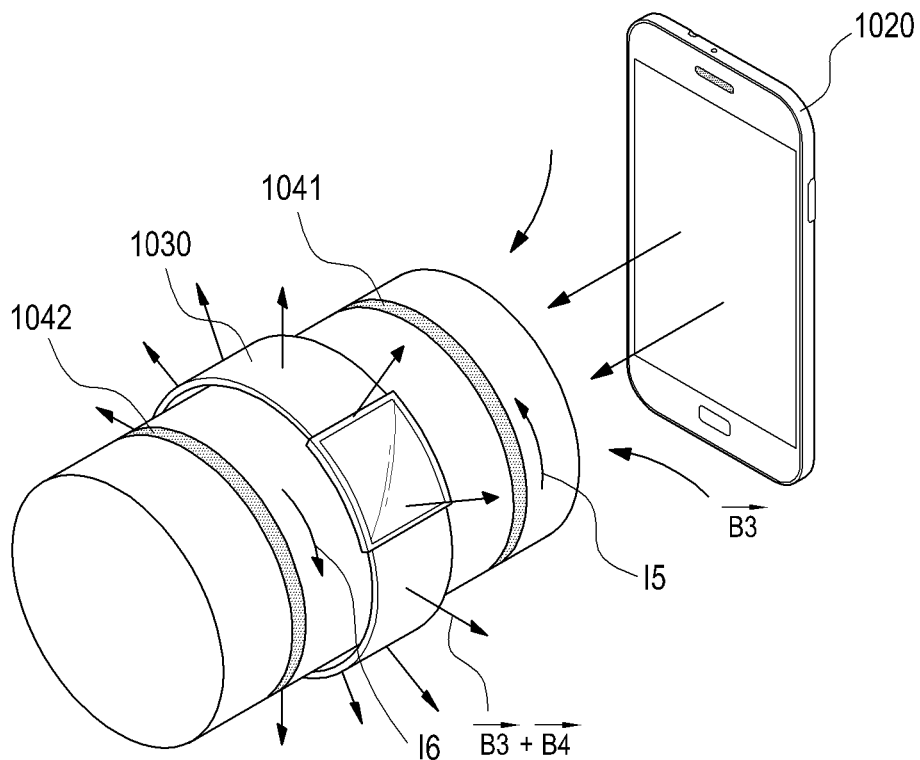

FIGS. 10A to 10C are conceptual views illustrating a wireless power transmitter according to various embodiments of the present disclosure. In the wireless power transmitter in FIGS. 10A to 10C, it is assumed that a first housing includes no coil. That is, in FIGS. 10A to 10C, a second housing in a pillar shape of the wireless power transmitter may include a first coil and a second coil.

Referring to FIG. 10A, a first wireless power receiver 1020 may be accommodated in contact with an internal side of the first housing of the wireless power transmitter 1010. That is, the first wireless power receiver 1020 may be accommodated in the wireless power transmitter 1010 such that a portion of the first wireless power receiver 1020 is in contact with a circumferential surface of an upper portion of a side wall of the first housing and another portion of the first wireless power receiver 1020 is in contact with the internal side of the first housing.

Referring to FIG. 10B, the first wireless power receiver 1020 may be mounted on the circumferential surface of the upper portion of the side wall of the first housing of the wireless power transmitter 1010. That is, the wireless power receiver 1020 may be mounted on the circumferential surface but may not be in contact with the internal side of the first housing. In this case, the height of the second housing in the pillar shape may be smaller than the height of the side wall of the first housing.

In the embodiments of FIGS. 10A and 10B, the first housing includes no coil, and the second housing may include the first coil and the second coil. FIG. 10C is a conceptual view illustrating that the second housing includes two coils.

As illustrated in FIG. 10C, the second housing in the pillar shape may include a first coil 1041 and a second coil 1042, which are spaced apart from each other by a preset distance and are disposed parallel to each other.

As illustrated in FIG. 10C, a current I5 may be applied to the first coil 1041 in a first direction. A current I6 may be applied to the second coil 1042 in a second direction, and the first direction may be opposite the second direction. A magnetic field B3 may be induced in the first coil 1041 by the applied current I5. In detail, the magnetic field B3 may be induced over the first coil 1041 in a direction in which the current is incident to the first coil 1041. A magnetic field B4 may be induced under the second coil 1042 in a direction in which the current is incident to the second coil 1042. The magnetic field B3 induced from the first coil 1041 and the magnetic field B4 induced from the second coil 1042 are summed to form a radial magnetic field between the first coil 1041 and the second coil 1042.

Accordingly, the first wireless power receiver 1020 disposed above the first coil 1041 may perform wireless charging based on the magnetic field B3 applied from the first coil 1041. In addition, a second wireless power receiver 1030 disposed between the first coil 1041 and the second coil 1042 may perform wireless charging based on the radial magnetic field.

Figure 10D:
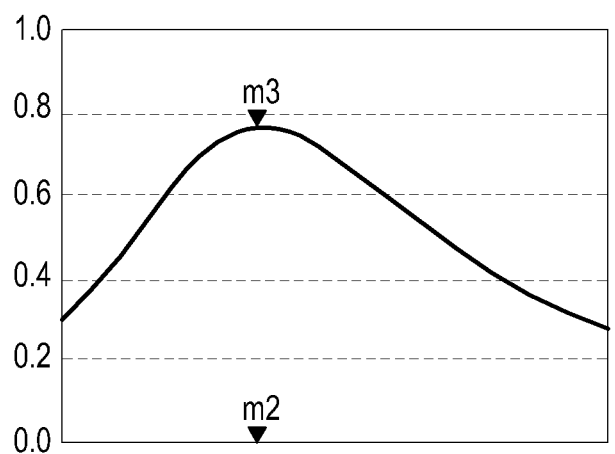
FIGS. 10D to 10F are graphs illustrating charge efficiency according to various embodiments of the present disclosure.
Figure 10E:
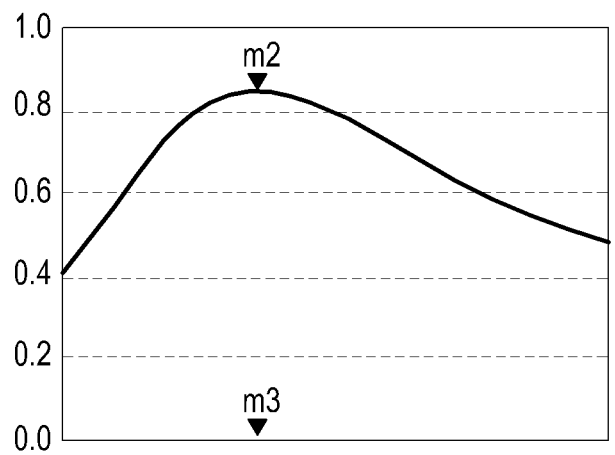
Figure 10F:
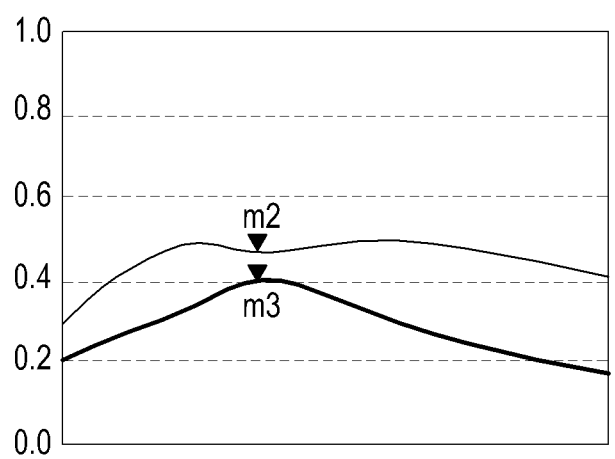

FIGS. 10D to 10f are graphs illustrating charge efficiency according to various embodiments of the present disclosure. FIG. 10D illustrates charging efficiency in the case of mounting a wristwatch-type electronic device on a pillar-shaped second housing, which is up to 76%, FIG. 10E illustrates charging efficiency in the case of accommodating a smartphone-type electronic device in a bowl-shaped first housing, which is up to 84%, FIG. 10F illustrates charging efficiency in the case of mounting a wristwatch-type electronic device on a pillar-shaped second housing and accommodating a smartphone-type electronic device in a bowl-shaped first housing at the same time, which is up to 85%.

Figure 11A:
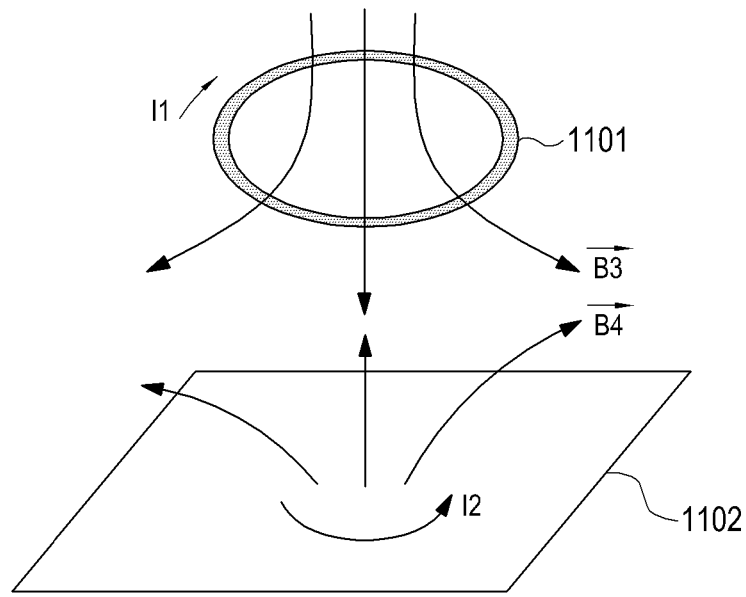
FIGS. 11A and 11B are conceptual views illustrating the configuration of a second coil according to various embodiments of the present disclosure.

FIG. 11A is a conceptual view illustrating the configuration of a second coil according to various embodiments of the present disclosure.

In the embodiment of FIG. 11A, the second coil may include one sub-coil 1101 and a metal plate 1102 disposed parallel to the sub-coil 1101. Here, the distance between the sub-coil 1101 and the metal plate 1102 may be determined based on the size of a coil of a wireless power receiver. As described above, the distance may also be adjusted.

A wireless power transmitter may apply current I1 to the sub-coil 1101. For example, the wireless power transmitter may apply a current I1 flowing clockwise to the sub-coil 1101. The sub-coil 1101 may induce a magnetic field B3 based on the applied current I1. The magnetic field B3 may be formed in the sub-coil 1101 in a downward direction.

The metal plate 1102 may be a conductor, and an induced current I2 may be generated on the metal plate 1102 by the magnetic field B3. The induced current I2 may be applied counterclockwise on the metal plate 1102. In addition, a magnetic field B4 may be induced by the induced current I2. The magnetic field B4 may be formed in an upward direction from the metal plate 1102 by the counterclockwise induction current I2. Accordingly, a radial magnetic field may be formed between the sub-coil 1101 and the metal plate 1102. The coil of the wireless power receiver disposed perpendicular to the metal plate 1102 may perform wireless charging at relatively high charging efficiency based on the radial magnetic field formed between the sub-coil 1101 and the metal plate 1102.

Figure 11B:
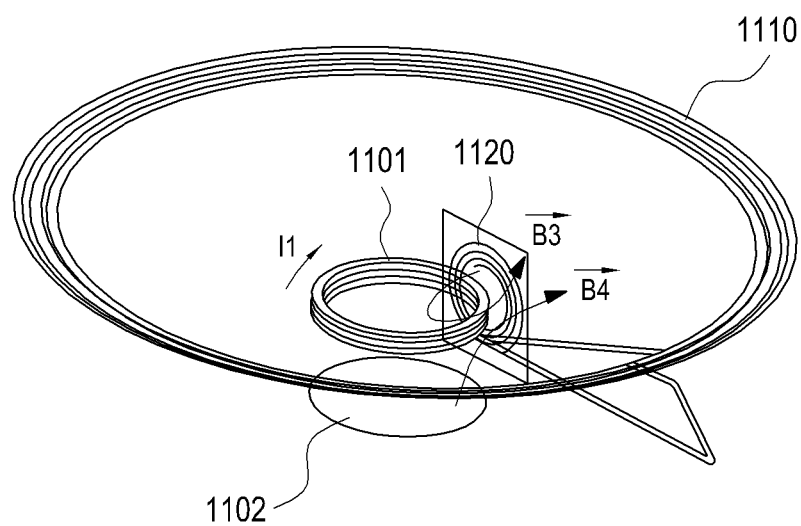

FIG. 11B is a conceptual view illustrating the configuration of a second coil according to various embodiments of the present disclosure.

As illustrated in FIG. 11B, a sub-coil 1101 may be connected to a first coil 1110. A coil 1120 of a second wireless power receiver may be mounted outwards between the sub-coil 1101 and a metal plate 1102. As described above, radial magnetic fields B3 and B4 may be formed between the sub-coil 1101 and the metal plate 1102. The coil 1120 of the second wireless power receiver may perform wireless charging using the vertically incident magnetic fields B3 and B4.

Figure 12A:
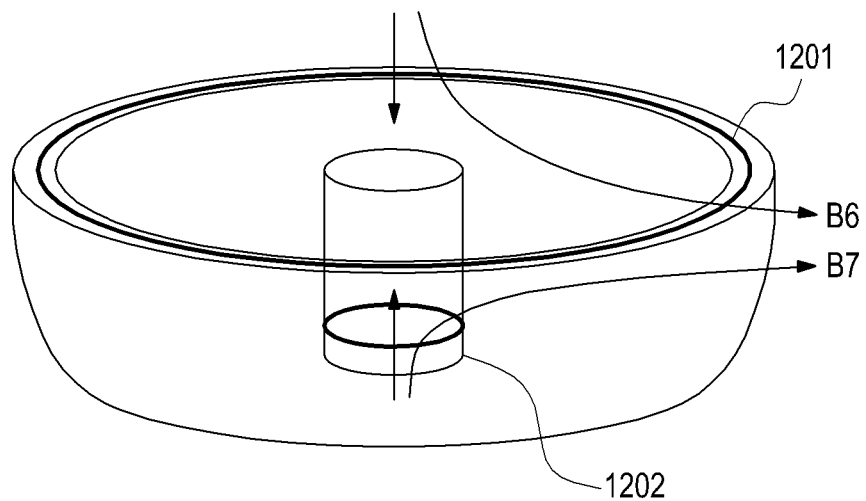
FIGS. 12A and 12B are conceptual views illustrating the configuration of a wireless power transmitter according to various embodiments of the present disclosure.

FIG. 12A is a conceptual view illustrating the configuration of a wireless power transmitter according to various embodiments of the present disclosure.

Referring to FIG. 12A, a first coil 1201 may be formed along the circumferential surface of an upper portion of a side wall of a bowl-shaped first housing. Further, a second coil 1202 may be formed along the circumferential surface of a side wall of a pillar-shaped second housing. The wireless power transmitter may apply a current to the first coil 1201, and the first coil 1201 may induce a magnetic field B6 based on the current. Further, the wireless power transmitter may apply a current to the second coil 1202, and the second coil 1202 may induce a magnetic field B7 based on the current. In various embodiments of the present disclosure, the wireless power transmitter may apply currents in different directions to the first coil 1201 and the second coil 1202, respectively, and thus a radial magnetic field may be formed between the first coil 1201 and the second coil 1202.

Accordingly, a first wireless power receiver accommodated in the bowl-shaped first housing may perform wireless charging based on the magnetic field B6 induced by the first coil 1201. Further, a second wireless power receiver mounted on the pillar-shaped second housing may perform wireless charging based on the radial magnetic field induced by the first coil 1201 and the second coil 1202.

Figure 12B:
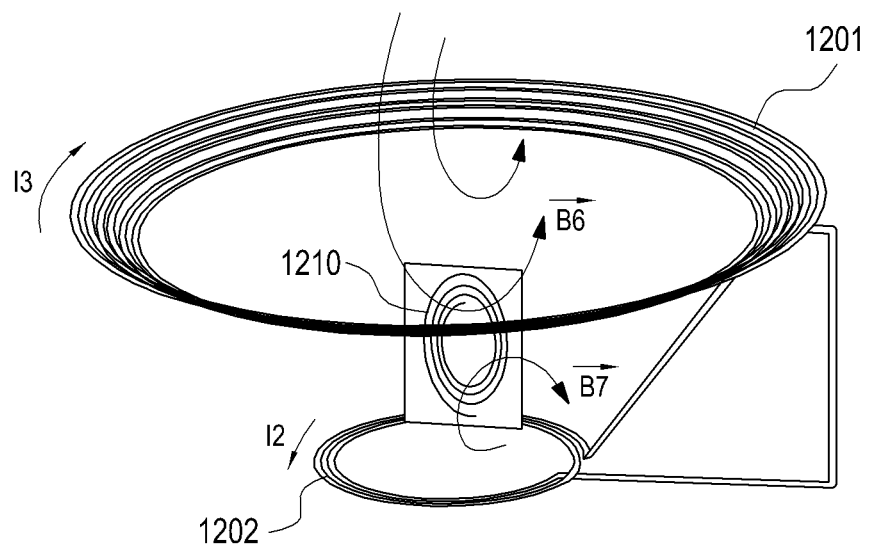

FIG. 12B illustrates an embodiment of the coil of the wireless power transmitter of FIG. 12A. As illustrated in FIG. 12B, the first coil 1201 and the second coil 1202 may be connected to each other, and the first coil 1201 may have a relatively greater radius than that of the second coil 1202. As illustrated in FIG. 12B, a coil 1210 of the second wireless power receiver may be mounted outwards between the first coil 1201 and the second coil 1202. As described above, radial magnetic fields B6 and B7 may be formed between the first coil 1201 and the second coil 1202. The coil 1210 of the second wireless power receiver may perform wireless charging using the vertically incident magnetic fields B6 and B7.

Figure 13A:
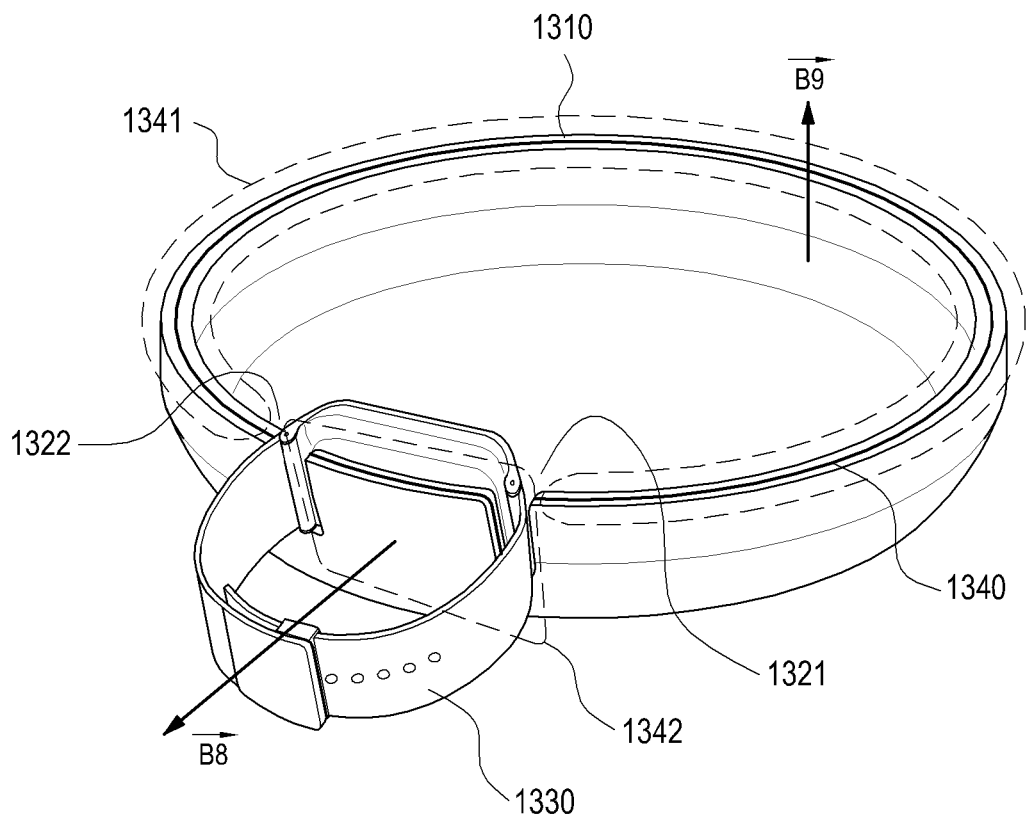
FIG. 13A is a conceptual view illustrating the configuration of a wireless power transmitter according to various embodiments of the present disclosure.

FIG. 13A is a conceptual view illustrating the configuration of a wireless power transmitter according to various embodiments of the present disclosure.

Referring to FIG. 13A, the wireless power transmitter according to various embodiments of the present disclosure may include a bowl-shaped first housing 1310. The first housing 1310 may have two grooves 1321 and 1322 in a side wall thereof for mounting a wireless power receiver. Here, the two grooves 1321, 1322 may be formed in a structure for mounting straps of a wristwatch-like electronic device that extend in opposite directions. Accordingly, as illustrated in FIG. 13A, a second wireless power receiver 1330 may be mounted in the grooves 1321 and 1322. The second wireless power receiver 1330 may be disposed in an orientation such that a coil included therein is perpendicular to the bottom of the first housing 1310.

Meanwhile, a coil 1340 may be included in the circumferential surface of the first housing 1310. For convenience of description, a coil disposed on an upper portion of the side wall of the first housing 1310, except for the grooves 1321 and 1322, may be referred to as a first coil 1341, and a coil disposed in the grooves 1321 and 1322 of the first housing 1310 and on side walls isolated by the grooves 1321 and 1322 may be referred to as a second coil 1342. That is, the first coil 1341 may be substantially parallel to the bottom of the first housing 1310, and the second coil 1342 may be substantially perpendicular to the bottom of the first housing 1310.

Figure 13B:
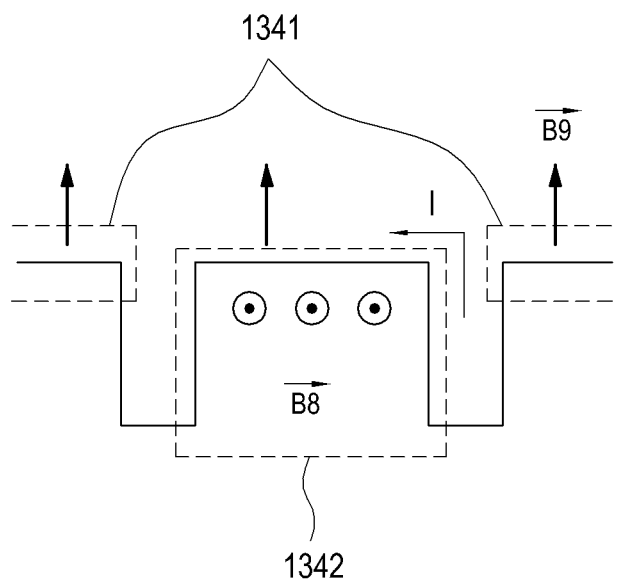
FIG. 13B is a side view of the coil of FIG. 13A.
Figure 13C:
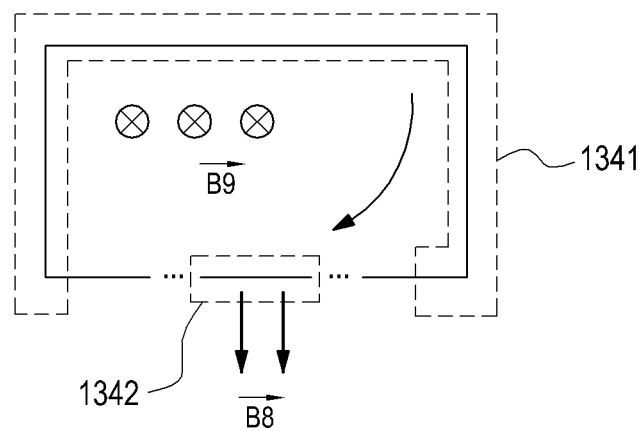
FIG. 13C is a plan view of the coil of FIG. 13A.

The wireless power transmitter may apply a current I to the coil 1340. The current I may be applied to the first coil 1341 and the second coil 1342. The first coil 1341 may induce a magnetic field B9 based on the applied current I, and the second coil 1342 may induce a magnetic field B8 based on the applied current I. The magnetic field B9 may be perpendicular to the bottom of the first housing 1310, and the magnetic field B8 may be perpendicular to the side wall of the first housing 1310. Accordingly, the second wireless power receiver 1330 may perform wireless charging at relatively high charging efficiency based on the magnetic field B8 perpendicular to the side wall. FIG. 13B is a side view of the coil 1340 of FIG. 13A, and FIG. 13C is a plan view of the coil 1340 of FIG. 13A. Referring to FIGS. 13B and 13C, the first coil 1341 may induce the magnetic field B9 perpendicular to the first coil 1341, and the second coil 1342 may induce the magnetic field B8 perpendicular to the second coil 1342. Accordingly, the wireless power transmitter may form a plurality of magnetic fields B8 and B9 perpendicular to each other, thus enabling wireless power receivers disposed in various orientations to perform wireless charging at relatively high charging efficiency.

Figure 13D:
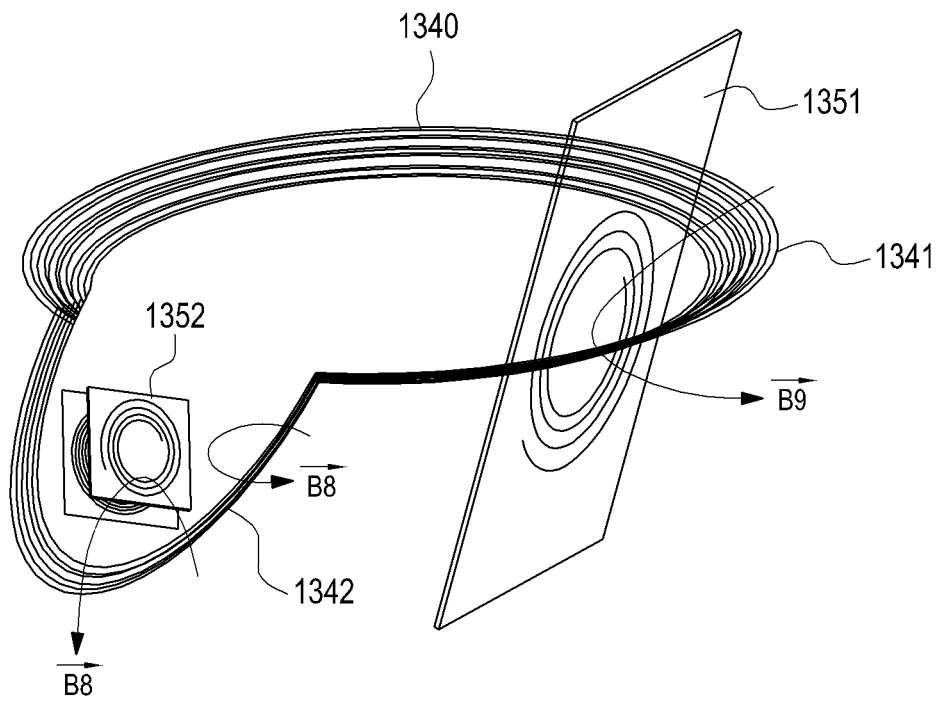
FIG. 13D is a conceptual view illustrating a magnetic field generated by a wireless power transmitter according to various embodiments of the present disclosure.

FIG. 13D is a conceptual view illustrating a magnetic field generated by a coil of a wireless power transmitter according to various embodiments of the present disclosure.

As illustrated in FIG. 13D, a magnetic field B9 may be formed around a wire of a first coil 1341 in a direction of surrounding the wire, and a magnetic field B8 may be formed around a second coil 1342 in a direction perpendicular to the second coil 1342. Accordingly, a coil 1351 of a first wireless power receiver mounted on the first coil 1341 may perform wireless charging using the substantially vertically incident magnetic field B9, and a coil 1352 of a second wireless power receiver mounted corresponding to the second coil 1342 may also perform wireless charging using the substantially vertically incident magnetic field B8.

Each of the foregoing elements of the wireless power transmitter may include one or more components, and the names thereof may be changed depending on the type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. A wireless power transmitter comprising:
   a housing configured to accommodate at least one wireless power receiver between a first portion of the housing and a second portion of the housing, wherein the at least one wireless power receiver is disposable between the first portion and the second portion based on the at least one wireless power receiver leaning against the first portion or being mounted on the second portion;

a first coil disposed in the first portion, and configured to generate a first magnetic field in a first direction; and a second coil comprising a plurality of sub-coils, disposed in the second portion, and configured to generate a second magnetic field in a second direction substantially vertical to the first direction, wherein the second magnetic field is a vector summation of sub-magnetic fields generated by the plurality of sub-coils, wherein the first coil surrounds an outer part of the second portion in which the second coil is disposed, and is disposed in parallel to the second coil, and wherein the wireless power transmitter is capable of charging the at least one wireless power receiver disposed between the first portion and the second portion, such a coil of the at least one wireless power receiver is substantially in vertical to the first coil and the second coil according to the at least one wireless power receiver leaning against the first portion or being mounted on the second portion, based on the first magnetic field and the second coil magnetic field.

2. The wireless power transmitter of claim 1, wherein the plurality of sub-coils are disposed parallel to each other.

3. The wireless power transmitter of claim 2, further comprising:

a driver configured to apply a current to the first coil and the second coil, wherein a first current is applied in a third direction from the driver to a first sub-coil of the plurality of sub-coils, and a second current is applied in a fourth direction from the driver to a second sub-coil of the plurality of sub-coils.

4. The wireless power transmitter of claim 3, further comprising:

at least one capacitor, wherein the third direction and the fourth direction are opposite directions, and wherein the first sub-coil, the second sub-coil, and the at least one capacitor have an odd-mode resonance frequency.

5. The wireless power transmitter of claim 2, wherein a first sub-coil and a second sub-coil are not connected via a cable.

6. The wireless power transmitter of claim 5, wherein the second sub-coil is configured to generate an induced electromotive force using a magnetic field generated by the first sub-coil.

* * * * *